(12) United States Patent
Albrecht et al.

(10) Patent No.: US 7,502,193 B2
(45) Date of Patent: Mar. 10, 2009

(54) POSITIONING OF A MAGNETIC HEAD IN A MAGNETIC DATA RECORDING DEVICE USING A MULTIPLE SENSOR ARRAY

(75) Inventors: Thomas Robert Albrecht, San Jose, CA (US); Bruce Alvin Gurney, San Rafael, CA (US); Ernesto E. Marinero, Saratoga, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 234 days.

(21) Appl. No.: 11/508,538

(22) Filed: Aug. 22, 2006

(65) Prior Publication Data

US 2007/0201160 A1    Aug. 30, 2007

Related U.S. Application Data

(63) Continuation-in-part of application No. 11/069,732, filed on Feb. 28, 2005.

(51) Int. Cl.
*G11B 21/02* (2006.01)
(52) U.S. Cl. ...................................................... 360/75
(58) Field of Classification Search ............... 360/75, 360/31, 48, 51, 67, 77.06, 77.08, 77.12, 78.14; 369/32; 714/763
See application file for complete search history.

(56) References Cited

U.S. PATENT DOCUMENTS

| | | | |
|---|---|---|---|
| 4,056,830 A | 11/1977 | Smith | 360/51 |
| 4,816,938 A | 3/1989 | Cowen et al. | 360/75 |
| 5,917,784 A | 6/1999 | Supino et al. | 369/32 |
| 6,046,879 A | 4/2000 | Hampshire | 360/77.08 |
| 6,219,814 B1 * | 4/2001 | Coker et al. | 714/763 |
| 6,515,812 B1 | 2/2003 | Bergmans et al. | 360/48 |
| 6,525,897 B2 | 2/2003 | Despain et al. | 360/77.06 |
| 6,556,367 B2 | 4/2003 | Takahashi | 360/67 |
| 6,594,103 B1 | 7/2003 | Despain et al. | 360/77.06 |
| 6,754,016 B2 | 6/2004 | Messner et al. | 360/48 |
| 6,760,185 B1 | 7/2004 | Roth et al. | 360/77.08 |
| 6,831,805 B2 * | 12/2004 | Chliwnyj et al. | 360/77.12 |
| 6,839,196 B2 | 1/2005 | Trivedi | 360/77.06 |
| 6,865,052 B2 * | 3/2005 | Chliwnyj et al. | 360/77.12 |
| 6,873,482 B1 | 3/2005 | Hsieh et al. | 360/48 |
| 6,909,566 B1 | 6/2005 | Zaitsu et al. | 360/31 |
| 7,186,019 B2 * | 3/2007 | Binnig et al. | 374/6 |
| 7,265,937 B1 * | 9/2007 | Erden et al. | 360/78.14 |
| 7,345,841 B2 * | 3/2008 | Baugh et al. | 360/75 |

* cited by examiner

*Primary Examiner*—Fred Tzeng
(74) *Attorney, Agent, or Firm*—Zilka-Kotab, PC

(57) ABSTRACT

A system method and apparatus for determining a position error signal (PES) for servo tracking in a data recording system using a data track. The PES is determined using a sensor array that includes a plurality of sensors offset from one another by certain predetermined distances in a direction perpendicular to the track direction. Correlation functions can be determined for pairs of sensors in the sensor array based on the signals read by the sensors. The results of these correlation functions can then be used to determine a PES by using a look up table or computational processor.

32 Claims, 17 Drawing Sheets

POSITIONING OF A MAGNETIC HEAD IN A MAGNETIC DATA RECORDING DEVICE USING A MULTIPLE SENSOR ARRAY

This is a Continuation In Part Application of commonly assigned U.S. patent application Ser. No. 11/069,732 entitled INTEGRATED SERVO AND READ EMR SENSOR, filed on Feb. 28, 2005, which is incorporated herein by reference.

FIELD OF THE INVENTION

The present invention relates to magnetoresistive sensors and more particularly to a device employing multiple Extraordinary Magnetoresistive (EMR) sensors for e.g., reading servo and data information from a magnetic medium.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic bits to and reading magnetic bits from the rotating disk. The read and write heads are connected to processing circuitry that operates according to a computer program to implement the writing and reading functions.

In recent read head designs a spin valve sensor, also referred to as a giant magnetoresistive (GMR) sensor has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal resulting in a low resistance state and when the magnetizations of the pinned and free layer are antiparallel, scattering is maximized resulting in a high resistance state. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause voltage changes that are detected and processed as playback signals.

In the ever increasing push for increased data rate and data capacity, engineers and scientists have continually found ways to make magnetoresistive sensors ever smaller. However such sensors are rapidly approaching a limit beyond which further reduction in size cannot be achieved. This is due in part to thermally induced fluctuations of the magnetization direction of the magnetic layers and in particular on the free layer magnetization in a Giant Magnetoresistance (GMR) or similar sensor. Thermal agitation becomes more severe as the sensor becomes smaller and the volume of the magnetic layers decreases accordingly. The magnetization fluctuation within the layers results in an increased sensor noise. Another form of noise that limits the extension of some sensors to small dimensions is present in GMR devices operated with the current perpendicular to the plane of the layers called spin torque noise that also contributes to the noise and reduces the signal to noise ratio of such devices. Other types of sensors that use magnetic layers have been investigated, including magnetic tunnel junction (MTJ) heads. Just like GMR heads, the MTJ heads exhibit magnoise and spin torque noise, both of which increase as device dimensions are made smaller. MTJ sensors also exhibit shot noise. With decreasing dimension eventually these noise sources will increase sufficiently to render many types of sensor unusable. Therefore, there is a need for a sensor that does not require the use of magnetic layers, and more specifically does not employ a magnetic free layer.

In order to develop such a non-magnetic magnetoresistive sensor, researchers have recently begun investigating what is referred to as the extraordinary magnetoresistive (EMR) effect. EMR theory is described by T. Zhou et al., "Extraordinary magnetoresistance in externally shunted van der Pauw plates", *Appl. Phys. Lett.*, Vol. 78, No. 5, 29 Jan. 2001, pp. 667-669. An EMR sensor for read-head applications is described by S. A. Solin et al., "Nonmagnetic semiconductors as read-head sensors for ultra-high-density magnetic recording", *Appl. Phys. Lett.*, Vol. 80, No. 21, 27 May 2002, pp. 4012-4014.

An EMR sensor operates based on the Hall Effect. When a charge carrier, such as an electron is moving through a material in the presence of both an electrical field and a magnetic field, the electron will be subject to a force along the electric field and a force given by the cross product of its velocity and the magnetic field. Thus the magnetic field tends to deflect the movement of carrier away from the direction of its motion. In some Hall devices that operate in a steady state, the carriers flow at an angle (called the Hall angle) with respect to the electric field given by $\tan(\theta) = (Mu) \times (B)$, where Mu is the material's mobility and B is the magnetic field. Some semiconductors can be made with Mu as large as about 60,000 $cm^2/Vs$ (=6/Tesla). At a magnetic field of 1 Tesla a Hall angle of 81 degrees can be achieved between the electric field and current flow resulting in a substantial change in the direction of motion of the carriers in a magnetic field.

An EMR device in its simplest form consists of an Ohmic bilayer structure of a metal and a high mobility semiconductor. When a pair of current leads are connected to a surface of the semiconductor at either end of the semiconductor, the current will tend to flow through the semiconductor to the more conductive metal (located opposite the current leads). The current will then travel readily through the more conductive material and then back through the semiconductor to the other current lead. When a magnetic field is applied perpendicular to the plane of the device, the Hall Effect will deflect the electrons so that some of them travel a longer distance through the more highly resistive semiconductor thus increasing the overall resistance of the device. This results in an increased resistance, which can be read as a voltage difference across the semiconductor, measured by voltage leads located on the same surface as the current leads. Thus the magnetoresistance of the device can be defined as the change in voltage between the voltage leads dVvv divided by the voltage applied to the current leads Vii, or $MR=dV/Vii$.

Additionally, resistances for the voltage leads Rvv and current leads Rii can be defined by dividing through by whatever current is flowing through the structure, so that $MR=dVvv/Vii=dRvv/Rii$.

While such EMR devices provide the advantage of sensing a magnetic field without the use of a magnetic layer such as a free layer, EMR devices have not yet been used in disk drive devices. This is because other magnetoresistive sensors such as GMR sensor have provided sufficient sensitivity and bit resolution for bit sizes used so far. But as bit sizes narrow GMR and other sensors will be unable to achieve the necessary resolution, making an alternative necessary. Particularly, the bit size and track density required for ultrahigh density magnetic recording present formidable challenges for current-art magnetic sensors and servo schemes. For example for recording at 1 Tb/in$^2$, the minimum domain size will be either a circular mark of ~15 nm in diameter or a rectangular ~15 nm×15 nm bit. The track spacing required to meet this areal density is ~25 nm. The minute flux emanating from such nanoscale domains is challenging to detect with current-art sensors, on account of fundamental limitations intrinsic to sensors based on ferromagnetic materials such as magnetic noise and spin torque effects. Furthermore, current-art sector servo schemes while effective for track seeking and synchronization operations, do not permit active feedback of the positioning of the write/read head during data writing and reading. This open-loop operation is expected to be a major source of errors and reliability failures as the track width and spacing fall below 50 nm. What is needed is a sensor device for ultrahigh density magnetic recording that allows on-the-fly real time detection of written bits in order to provide precise servo information to the sensor in a closed-loop configuration.

SUMMARY OF THE INVENTION

The present invention provides a system for providing a Position Error Signal (PES) on a continuous basis using a data track, without the need for a separate servo track or servo sector. The invention advantageously saves valuable media real estate, while providing PES servo information on a continuous real time bases during reading and writing functions. The invention includes the use of a sensor array that includes multiple read sensors each having a unique position on the array relative to a data track (e.i. perpendicular to the data track). The output or response from the sensors can be used to determine the position of the sensor array over the track by comparing correlation functions between pairs of sensors in the array.

The present invention overcomes the aforementioned drawbacks and provides the desired advantages by employing magnetic sensor elements based on the recently discovered Extraordinary Magneto Resistive (EMR) effect. EMR devices can provide a higher magnetoresistive response that current-art sensors, and as they comprise no ferromagnetic elements, they are free of magnetic noise which is caused by fluctuations of the magnetization direction on account of environmental thermal fluctuations. Two dedicated EMR sensors are employed in the invention: one for data reading and one for servo operations. The sensors are preferably configured in an abutted configuration. The high spatial resolution of the sensor elements comprising this invention is achieved by matching the spacing between the probe leads that detect the magnetic excitations from the recorded medium, as well as the width of the semiconductor stripe to be of comparable dimensions to the track width being read (for the read sensor) and to the recorded information needed to be sensed for servo operations. The present invention allows on-the-fly real time detection of written bits in order to provide precise servo information to the sensor in a closed-loop configuration.

The invention also results in significant increments in areal density by allowing reduction or elimination of components of the servo-sector information typically found on state of the art hard disks. Furthermore, the invention allows recording on patterned media exhibiting wider island position error tolerance than is otherwise required employing current-art servo schemes.

In addition to magnetic recording systems, a sensor according to the present invention is also useful in a magnetic imaging device such as a scanning magnetometer. Such a magnetometer includes a chuck for holding a workpiece and an actuator that is capable of moving the sensor in a rasterized pattern over the workpiece to read the magnetic topography of the workpiece. A sensor according to the present invention may also be useful in other devices requiring a high sensitivity, high resolution sensor.

These and other aspects and advantages of the invention will become apparent upon further reading of the detailed description.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

The present invention utilizes an integrated read and servo device comprising two (or more) closely positioned narrow track EMR devices. For instance, two dedicated EMR sensors can be employed: one for data reading and one for servo operations.

Because EMR technology is new, to aid the understanding of the reader the following description shall begin with a description of EMR sensors, followed by a description of the integrated read and servo device.

EMR Sensor

Figure 1:
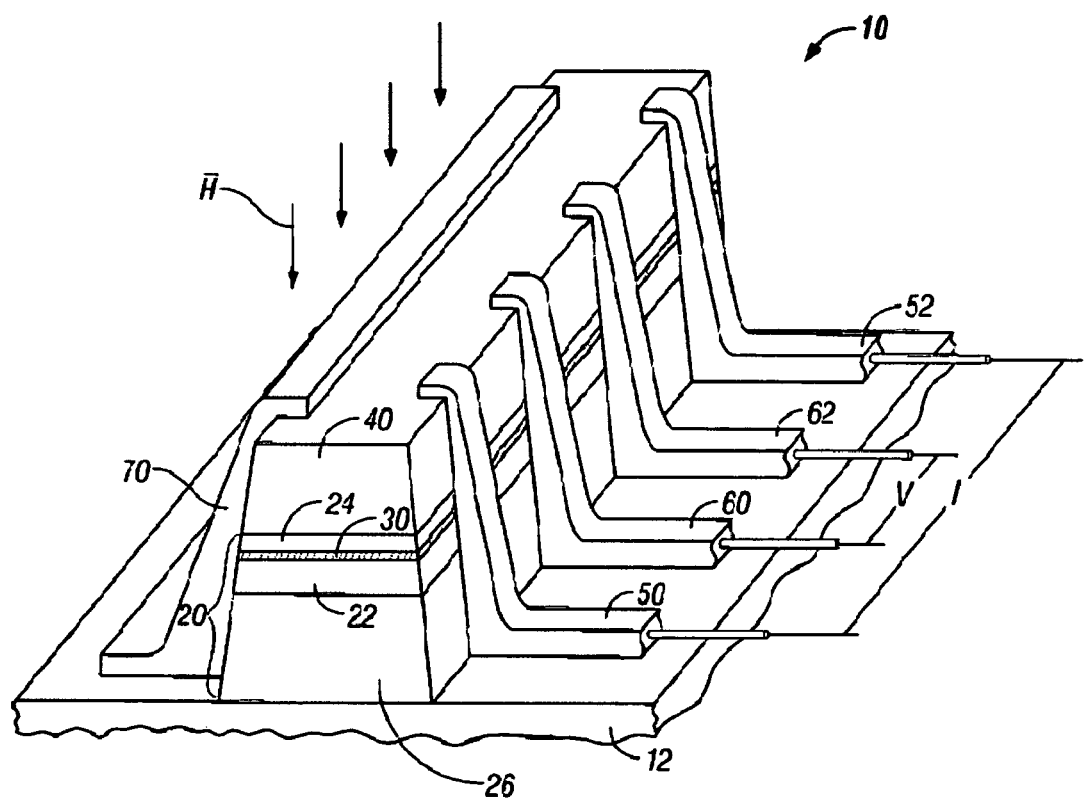
FIG. 1 is an isometric view of an EMR sensor.

FIG. 1 is an isometric view of an EMR sensor 10 according to one embodiment. The EMR sensor 10 includes a structure 20 that is a III-V heterostructure formed on a semiconducting substrate 12 such as GaAs. However, the EMR sensor described in this invention is not restricted to III-V semiconductor materials. For example, it may also be formed on the basis of silicon. The heterostructure 20 includes a first layer 22 of semiconducting material having a first band-gap, a second layer 30 of semiconducting material formed on top of the first layer 22 and having a second band gap smaller than the first band gap, and a third layer 24 of semiconducting material formed on top of the second layer 30 and having a third band gap greater than the second band gap. The materials in first and third layers 22, 24 may be similar or identical. An energetic potential well (quantum well) is created by the first, second and third semiconducting material layers due to the different band-gaps of the different materials. Thus carriers can be confined inside layer 30, which is considered the EMR active film in the sensor 10.

The first layer 22 is typically formed on top of a buffer layer 26 that may be one or more layers. The buffer layer 26 comprises several periods of a superlattice structure that function to prevent impurities present in the substrate from migrating into the functional layers 22, 24 and 30. In addition, the buffer layer 26 is chosen to accommodate the typically different lattice constants of the substrate 12 and the functional layers of the heterostructure 20 to thus act as a strain relief layer between the substrate and the functional layers.

One or more doping layers are incorporated into the semiconducting material in the first layer 22, the third layer 24, or both layers 22 and 24, and spaced apart from the boundary of the second and third semiconducting materials. The doped layers provide electrons (if n-doped) or holes if (p-doped) to the quantum well. The electrons or holes are concentrated in the quantum well in the form of a two-dimensional electron-gas or hole-gas, respectively.

As described in the previously-cited references, the layers 22/30/24 may be a $Al_{0.09}In_{0.91}Sb/InSb/Al_{0.09}In_{0.91}Sb$ heterostructure grown onto a semi-insulating GaAs substrate 12 with a buffer layer 26 in between. InSb is a narrow band-gap semiconductor. Narrow band-gap semiconductors typically exhibit high electron mobility, since the effective electron mass is greatly reduced. Typical narrow band-gap materials are InSb and InAs. For example, the room temperature electron mobility of InSb and InAs are 60,000 $cm^2/Vs$ and 35,000 $cm^2/Vs$, respectively.

The bottom $Al_{0.09}In_{0.91}Sb$ layer 22 formed on the buffer layer 26 has a thickness in the range of approximately 1-3 microns and the top $Al_{0.09}In_{0.91}Sb$ layer 24 has a thickness in the range of approximately 10 to 1000 nm, typically 50 nm. The n-doping layers incorporated into layer 22 or 24 have a thickness from one monolayer (delta-doped layer) up to 10 nm. The n-doping layer is spaced from the InSb/$Al_{0.09}In_{0.91}Sb$ boundaries of first and second or second and third semiconducting materials by a distance of 10-300 Å. N-doping is preferred, since electrons typically have higher mobility than holes. The typical N-dopant is silicon with a concentration in the range of 1 to $10^{19}/cm^3$. The deposition process for the heterostructure 20 is preferably molecular-beam-epitaxy, but other epitaxial growth methods can be used.

A capping layer 40 is formed over the heterostructure 20 to protect the device from corrosion. The capping layer is formed of an insulating material such as oxides or nitrides of aluminum or silicon (e.g., $Si_3N_4$, $Al_2O_3$) or a non-corrosive semi-insulating semiconductor.

Two current leads 50, 52 and two voltage leads 60, 62 are patterned over one side of the EMR structure 20 so that they make electrical contact with the quantum well. A metallic shunt 70 is patterned on the side opposite the current and voltage leads of the EMR structure 20 so that it makes electrical contact with the quantum well. The applied magnetic field H, i.e., the magnetic field to be sensed, is shown by the arrows and is normal to the plane of the films in the EMR structure 20. The leads typically comprise metallic contacts, for example Au, AuGe, or Ge diffused into the device. The leads are typically formed after formation of the capping layer 40, and sometimes after removal of some of the capping layer material.

Figure 2:
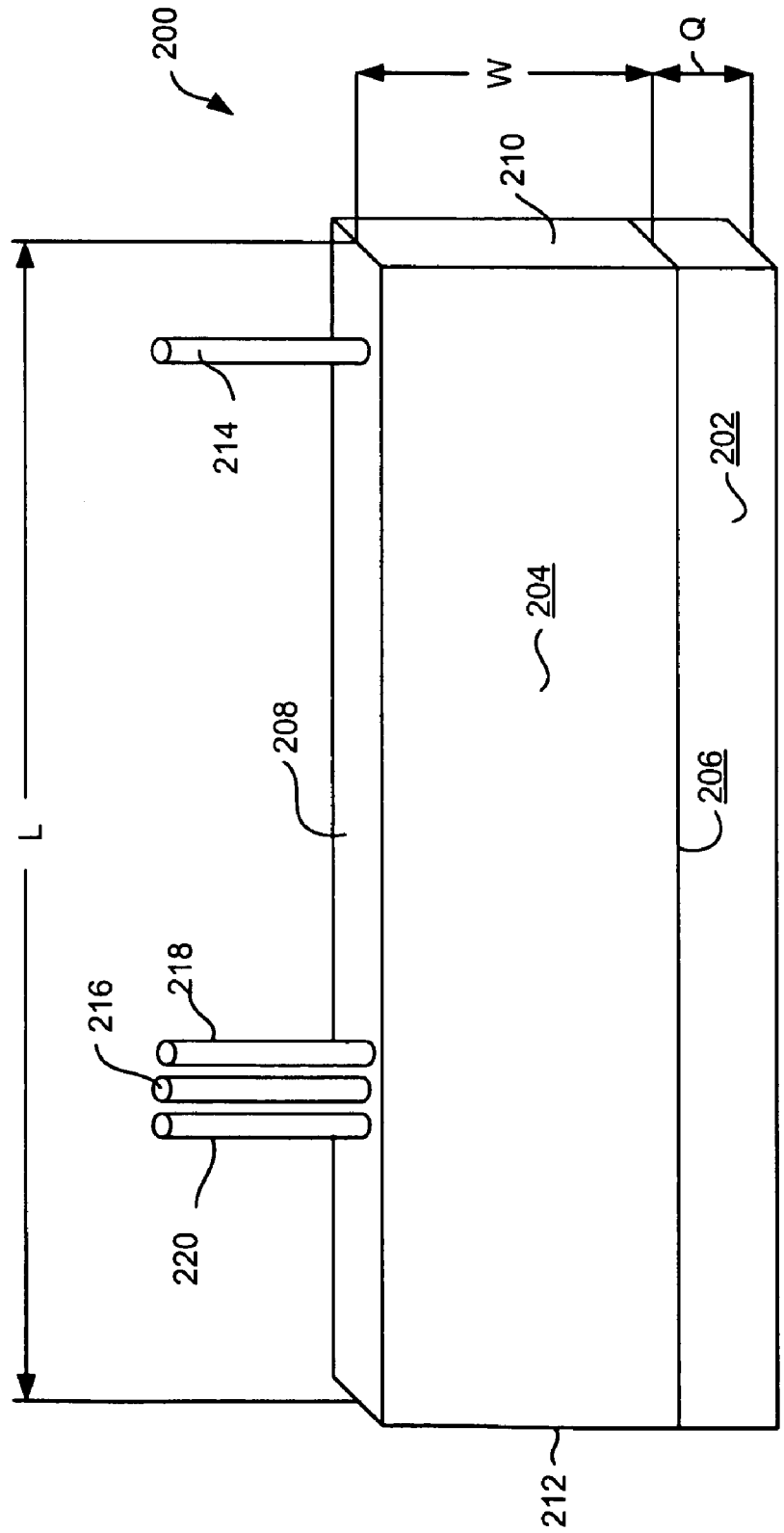
FIG. 2 is an isometric view of an EMR sensor according to a preferred embodiment of the present invention.

FIG. 2 illustrates an Extraordinary Magnetoresistive (EMR) sensor 200 according to a preferred embodiment of the invention. As shown, the sensor 200 includes a layer of electrically conductive material 202. The sensor 200 also includes a layer of semiconductor material 204 that has an edge that contacts the conductive layer 202 at an interface 206 and has an edge surface 208 opposite the interface 206. The semiconductor layer terminates at first and second ends 210, 212 defining a length L and has a width W. The layer of conductive material 202 preferably has the same length L as the semiconductor layer 204 and has a width Q.

The semiconductor layer 204 generally is a semiconductor heterostructure comprising a 2D electron or hole gas as described in the prior art. More specifically, a high mobility semiconductor such as InSb or InAs is employed. However, lower mobility materials may be appropriate for devices with L smaller than approximately the mean free path of the carriers. The electrically conductive layer 202 can be for example a metal, and can be any conducting metal, such as Au, that achieves an ohmic or nearly ohmic contact with the semiconductor. The metal conductivity should exceed that of the semiconductor in order to achieve a large magnetoresistance dRvv/Rii.

A contact resistance between the semiconductor layer 204 and the metal layer 202, will likely exist due to the band structure mismatch of the two materials and any interdiffusion that has occurred. The contact resistance may be in the range of 1E-8 ohm cm² to 1E-6 ohm cm². With continued reference to FIG. 2, the sensor 200 includes first and second current leads 214, 216, that are electrically connected with the edge surface 208 of the semiconductor layer 204 opposite the interface 206. The first current lead 214 is located near an end 210 of the semiconductor layer 204, whereas the second current lead 216 is located at about 2L/3 from the same end 210. One of the leads, such as 214 is an input lead supplying current into the sensor 200, while the other lead 216 is an output lead conducting the electrical current back out of the sensor. However, the polarity of the leads 214, 216 is not critical, and lead 214 could be the output lead while lead 216 could be the input lead.

The inventors have found that locating the second current lead 216 some distance away from the end 212 results in a very large increase in magnetoresistance. This increase is maximized when the lead 216 is located about ⅔ of the distance from the opposite end 210 of the sensor 200. This arrangement is fundamentally different from the arrangement of current leads use in prior art devices, wherein the current leads were each positioned at or near the ends of the device.

Figure 3:
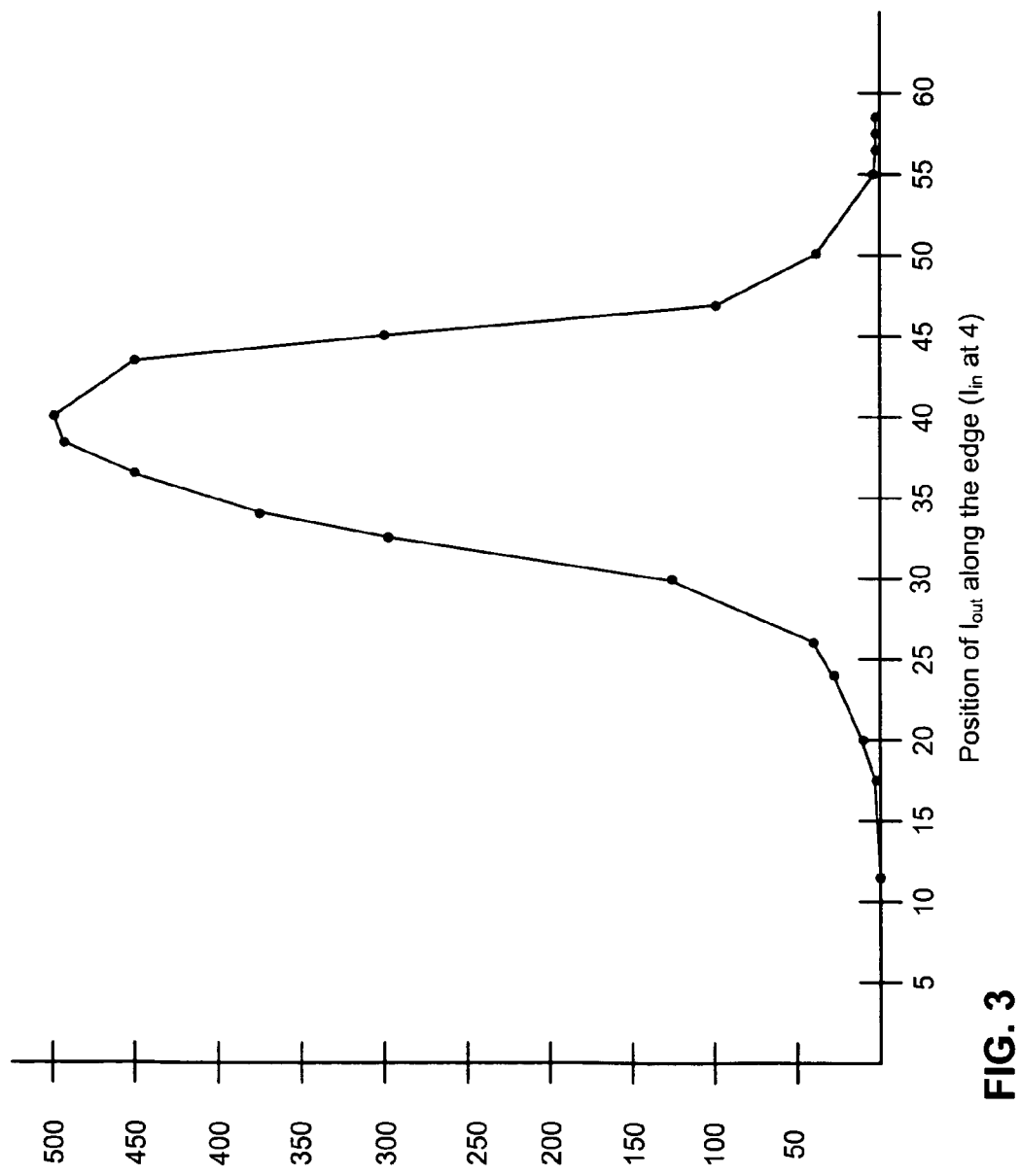
FIG. 3 is a graphical representation of the relationship between signal strength and current lead location.

FIG. 3 illustrates the relationship between signal strength (shown in arbitrary units) with respect to current lead placement. The length of the sensor can be seen as being divided into 60 equal increments. It can be seen from FIG. 3, that the maximum signal strength is achieved when one of the current leads is located about ⅔ of the distance along the sensor edge, or at "40" along the x axis of the graph. Although the positions of the current leads specify one of the leads being $I_{out}$ and the other being $I_{in}$, as mentioned above, the polarity is not critical and can be reversed.

With reference again to FIG. 2, the sensor 200 further includes first and second voltage leads 218, 220, electrically connected with the edge surface 208. As can be seen, the voltage leads are located at either side of the second current lead 216 and are located very close to the current lead 216. In fact the distance between the voltage leads 218, 220 are located as close to one another as possible without causing an electrical short between one of the voltage leads 218, 220 and the current lead 216. The distance between the voltage leads 218, 220 defines the track width of the sensor 200, and since a narrow track width is desired for maximum data density, the close spacing between the voltage leads 218, 220 provide exceptional signal resolution, and very small track width. The distance between the voltage leads 218, 220, therefore, is preferably not greater than 30 nm and is more preferably not greater than 20 nm. Of course, electrical isolation of the voltage leads 218, 220 from the current lead 216 must be maintained and further advances in lithographic and other manufacturing processes may allow the leads to be constructed even closer together.

In addition to exceptional signal resolution and narrow track width, the above described position of the voltage leads provides greatly increased magnetoresistance. As discussed above a magnetoresistive sensor detects magnetic field as a change in resistance of the sensor in response to the presence of a magnetic field. These changes in resistance are detected as voltages changes across the first and second voltage leads.

Figure 4A:
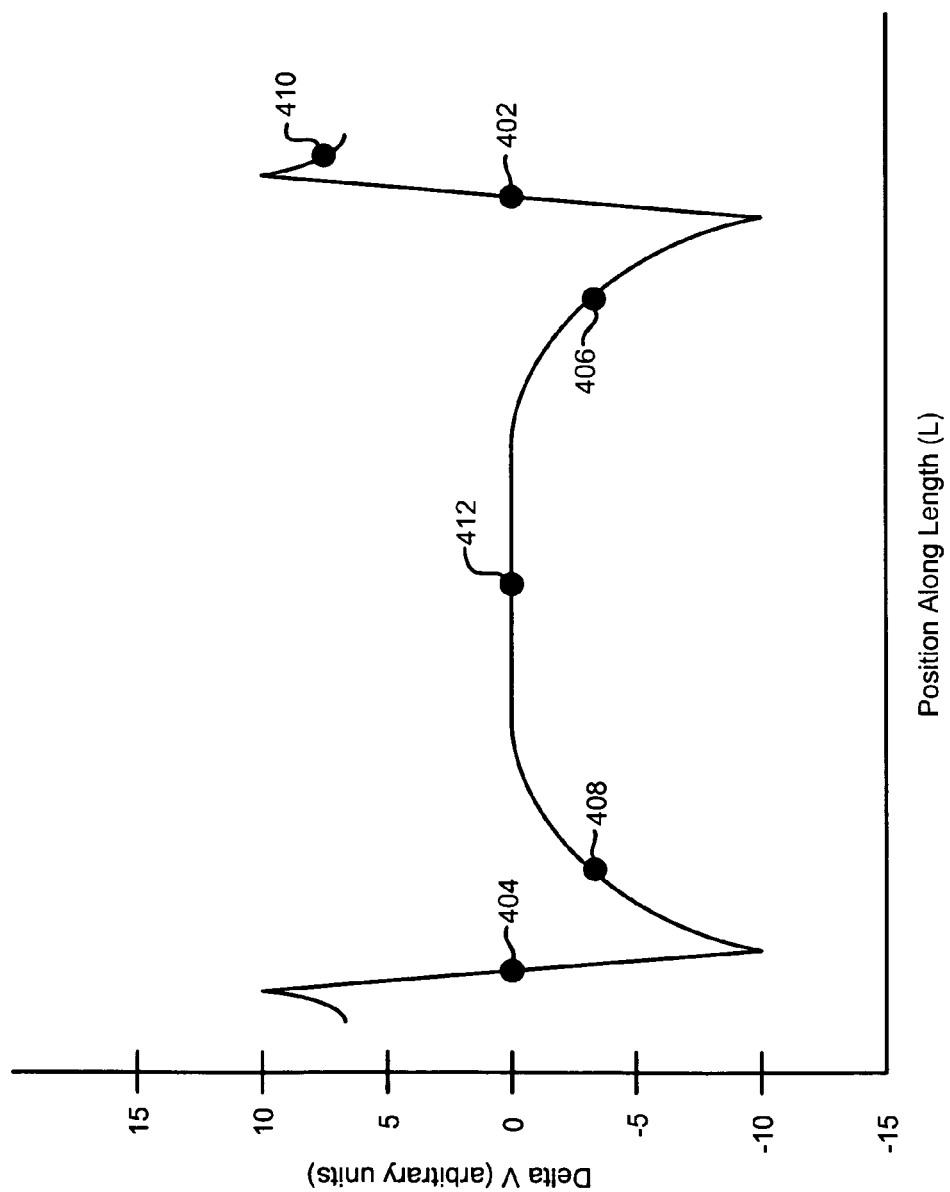
FIGS. 4A and 4B are graphical representations of the relationship between voltage and lead position along a length of a sensor according to the prior art (4A) and according to an embodiment of the invention (4B).
Figure 4B:
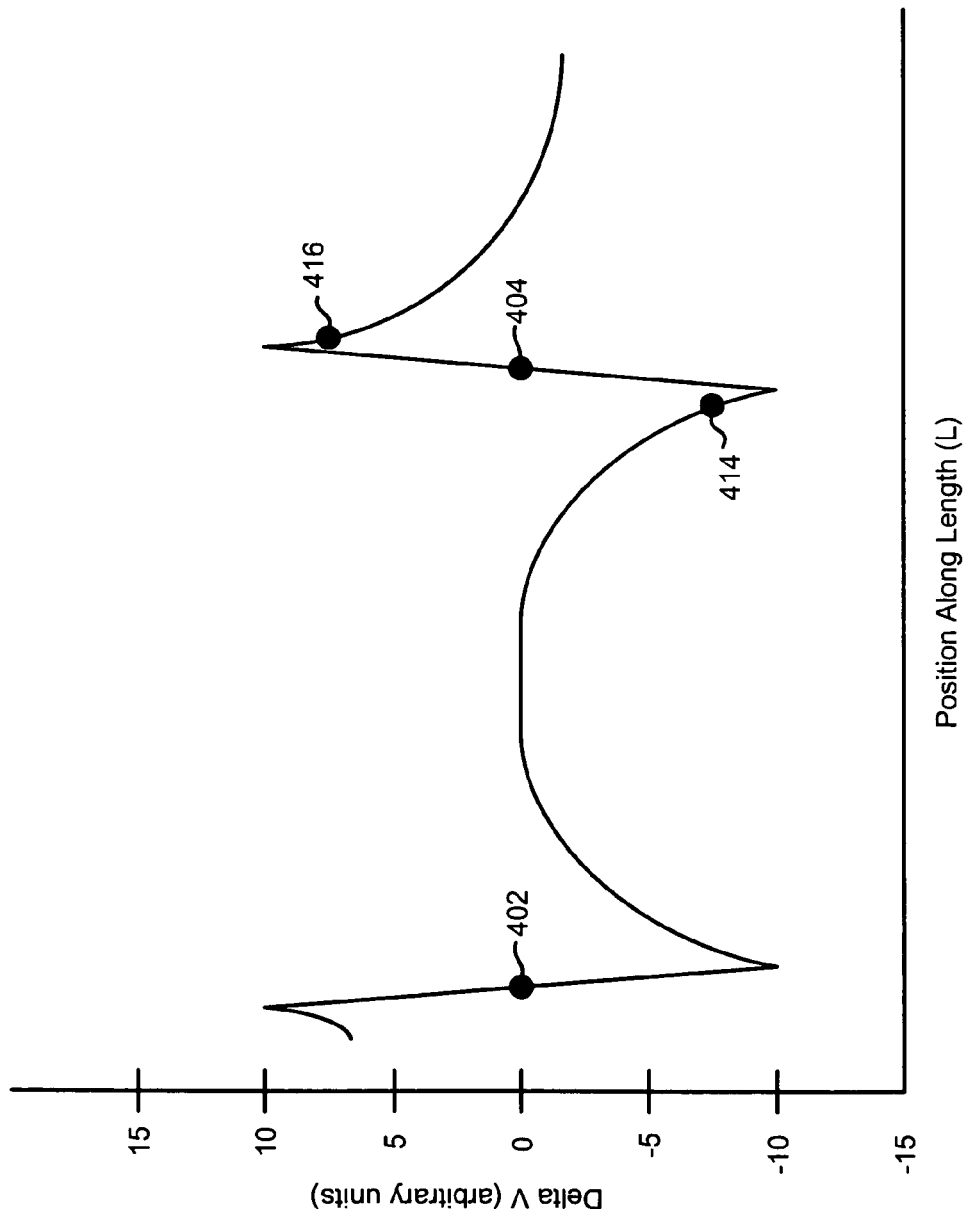

To better understand the exceptional dRvv/Rii performance provided by the lead configuration of the present invention, consider FIGS. 4A and 4B. Remembering that it is the voltage difference between two points on the sensor in response to a magnetic field that we are interested in measuring, FIGS. 4A and 4B illustrate the change in resistance at locations across the length of the sensor.

Locations 402 and 404 indicate the location of the first and second current leads 214, 216 on the sensor 200 (FIG. 2). With reference to FIG. 4A which illustrates prior art arrangements of voltage leads relative to current leads, one can see that if the voltage leads are both located at just inside the first and second current leads at locations 406, 408 very little difference in voltage will be detected. If one were to measure the voltage at a location just outside of one of the current leads, location 410 and also at the midpoint between the two current leads, location 412, a slightly larger voltage change would be detected.

However, with reference now to FIG. 4B which illustrates a possible voltage lead current lead arrangement according to the present invention, if one were to measure the voltage at either side of 404 employing leads at positions 414 and 416, an extremely large voltage difference can be detected. It should also be pointed out that, as discussed above, one of the current leads is located at a position 404 that is about ⅔ of the distance along the edge of the device as measured from one end to another. This placement of the voltage leads maximizes the signal and does so over a very small lateral distance, resulting in high spatial resolution. The placement of the voltage leads 218, 220 on either side of and very close to one of the current leads 216, therefore, provides two enormous benefits. First it provides a very large magnetoresistive signal. Second it allows the sensor 200 to have an extremely narrow track width, since the track width is only the distance between the voltage leads 218, 220.

Locating the triad of voltage/current/voltage leads 218, 216, 220 about ⅔ of the distance along the length (L) of the sensor provides a third advantage by further increasing the magnetoresistance of the sensor as discussed above. The distance between the voltage leads 218, 220 is only limited by the lithographic capabilities of forming the leads 216, 218, 220. Furthermore, the sensor is scalable in that the sensor can be made a small as the lithographic and other available manufacturing processes will allow, as long as the relative proportions of the sensor remain essentially the same.

With reference again to FIG. 2, in operation, a current is caused to flow from one of the current leads 214 to the other current lead 216. In the absence of a magnetic field the resulting electrical current will flow from the lead 214 directly through the semiconductor material to the conductive layer 202. It will flow through the conductive layer relatively very easily and then back through the semiconductor 204 to the other lead 216. The resistance in the absence of a magnetic field will then be essentially twice the resistance through a width W of the semiconductor material.

In the presence of a magnetic field, the Hall effect on the charge carriers causes more of the current to flow through the semiconductor material 204 without passing through the electrically conductive layer 202. Since the semiconductor layer has a much higher resistance than the electrically conductive layer 204 this will result in a much higher resistance through the sensor, which can be read as a signal as described above. In order to achieve desired exceptional performance, the semiconductor layer 204 preferably has proportions such that W/L is between 1/60 and 1/5 and can be about 1/10. The distance between the voltage leads 218, 220 for magnetic read sensor applications should be chosen to be about the same as the data track width and is preferably L/15. The voltage leads 218, 220 are preferably each separated from the current lead by a distance of about L/30 or less. As the signal detected across the voltage probes depends on the spacing between the voltage leads 218, 220, this spacing should not be greater than 33% of the track width (1.33×L/15).

However, the minimum lithographically attainable feature size and the finite width of the voltage and current leads result in being able to locate the voltage leads 218 and 220 only a minimum distance away from the second current lead 216 in order to avoid shunting. A typical voltage edge to current edge separation possible today is about 30 nm, making the device potentially able to measure a 60 nm by 60 nm area. Improvements in lithography techniques that will accompany any improvements in areal density will make even smaller areas of high sensitivity possible.

However larger separations may also be of advantage if low cost or other applications with much lower resolution are considered. Thus the typical voltage to current lead separation measured edge to edge should be in the range of 30 nm and 3 µm. Of course the length of the sensor L will also be determined by this separation and will approximately be about 10-30 times larger than the edge-to edge separation of the voltage leads and second current lead. The length of the sensor would typically be in the range 300 nm to 90 µm., but can be as large as millimeters for some sensor applications.

It should be appreciated that the materials making up the sensor can be such that the current flow between the current leads 214, 216 is primarily by charge carriers that are electrons or can be chosen so that the charge carriers are primarily holes. In addition, as mentioned above the current flow can be in either direction between the leads 214, 216.

A method that can ensure the proper placement of the voltage leads relative to the current leads is to define the semiconductor layer 204, electrically conductive layer 202 and the leads 214, 216, 218, 220 in a single masking making all features from the same material. In this manner the voltage and current probes are self aligned. After patterning of the sensor 200 further lead layers can be aligned to the sensor structure 200. It is understood that other methods for forming the sensor can be employed.

Integrated Servo and Read Sensor EMR Device

Two dedicated EMR devices (sensors) are employed in the invention: one for reading data from a magnetic domain(s) of interest and one for servo operations, i.e., positioning the read sensor over the magnetic domain(s) of interest. The sensors are preferably configured in an abutted configuration. High spatial resolution of the sensor elements comprising this invention can be achieved by matching the spacing between the probe leads that detect the magnetic excitations from the recorded medium, as well as making the width of the semiconductor stripe to be of comparable dimensions to the track width being read (for the read sensor) and to the recorded information needed to be sensed for servo operations.

Figure 5:
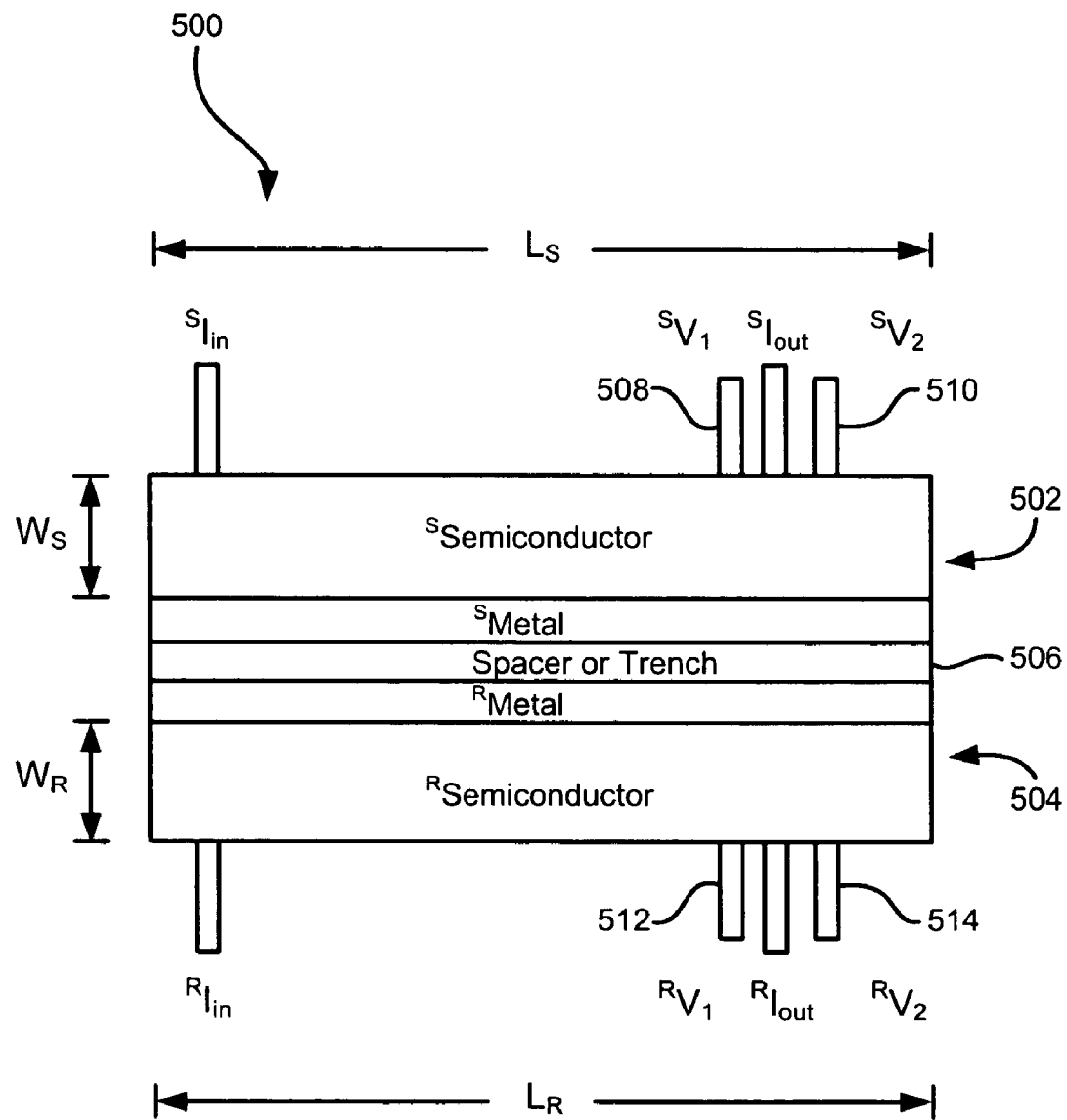
FIG. 5 is a side view of an integrated servo and read sensor EMR device according to one embodiment.

A basic embodiment of an integrated servo and read sensor EMR device 500 for magnetic recording is shown in FIG. 5. As shown, two narrow track EMR sensors 502, 504 are fabricated so that they are electrically isolated by a spacer layer 506 that hinders the transport of charge from one device to the other. The spacer 506 can be formed of alumina or other electrically nonconductive material. Note that the spacer 506 could also be a lithographically defined trench that also electrically isolates the sensors 502, 504.

The ancillary electronics for operating the sensors 502, 504 as well as for executing the reading and servo operations are not shown; however as known to those skilled in the art, it could involve separate dedicated components for reading and servoing, and/or some of these components could also be shared. The spacing between the voltage leads ($V_1$, $V_2$) 508, 510, 512, 514 and their location along the edge of the semiconductor, determines the spatial resolution of the device, as discussed above. The $V_1$-$V_2$ spacing for the read sensor 504 is chosen to be about the same as the track-width dimension to achieve the highest spatial resolution with high sensor signal. The dimension W (width of the semiconductor stripe) for the read sensor 504 is also matched to the size of the minimum on-track bit length. This provides a very sensitive read detector which is mag-noise free, requires no shields and is suitable for detection of nanoscopic magnetic domains. The corresponding spacing of $V_1$-$V_2$ for the servo sensor 502 is preferably adjusted to optimize the servo scheme employed (i.e.: servoing either by using the signal from the track being read/written to or from adjacent tracks) and to take care of skew angle issues when a conventional arm suspension is employed to translate the read/servo device between the inner diameter (ID) and the outer diameter (OD) of the media.

In FIG. 5, the subscripts R and S are employed to identify the EMR components for the Servo and Read devices which include the semiconductor and metal shunt materials, as well as the current and voltage leads for each sensor. (Note FIG. 2.) For simplicity, in FIG. 5, both EMR elements 502, 504 are drawn having identical dimensions for the servo and read components. However, as indicated by the symbols $W_R$, $L_R$ and $W_S$ and $L_S$ (where W denotes width and L denotes length), the size of each component as well as the materials involved can be adjusted to optimize the performance of each sensor 502, 504 in the integrated device 500. Examples of choices on the geometrical arrangement of the voltage probes are taught in this disclosure while describing the preferred embodiments.

Figure 6A:
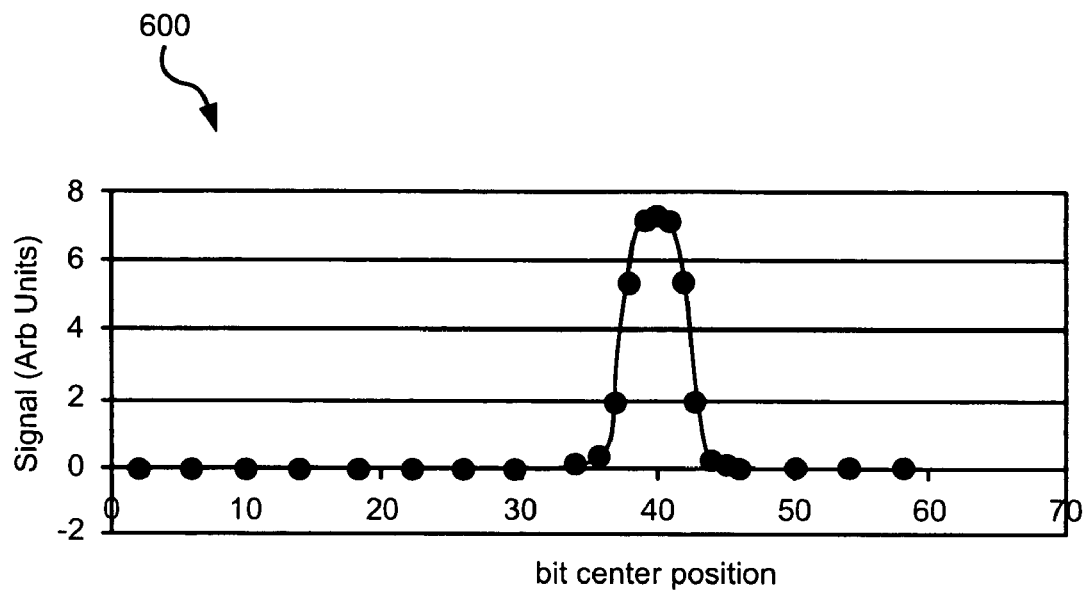
FIGS. 6A and 6B are graphical representations of a signal response to a 50 mT excitation of the EMR (read or servo) components of the integrated device according to one embodiment.
Figure 6B:
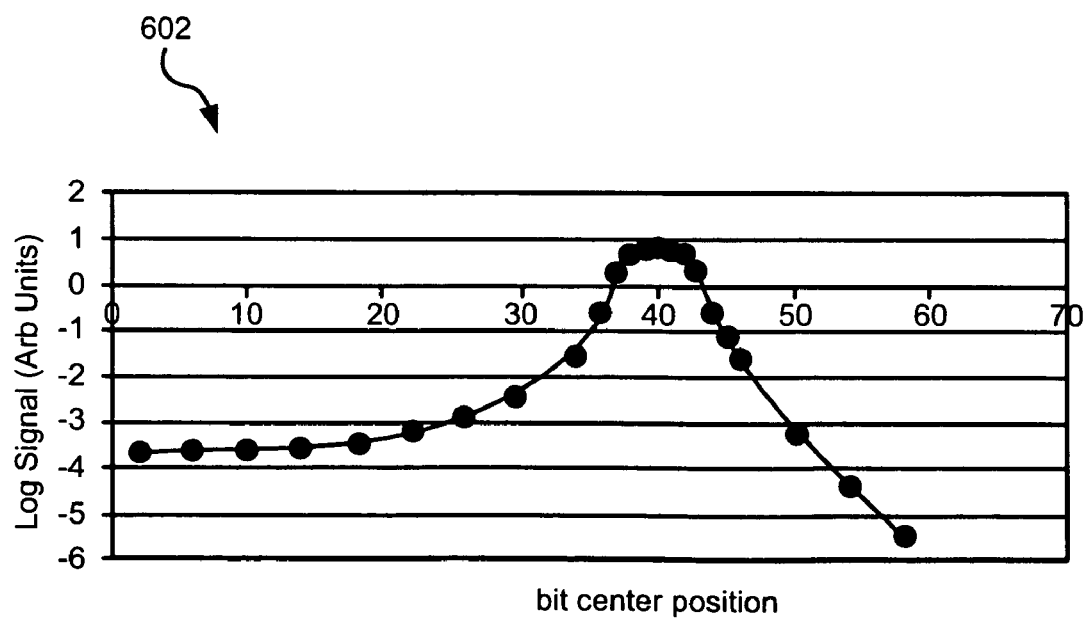

The next consideration is the exceptionally high spatial resolution provided by the sensors of this invention. In FIGS. 6A-6B, the calculated signal response of an unshielded EMR sensor to a magnetic bit of width comparable to the $V_1$-$V_2$ spacing is illustrated. The $I_{out}$ current lead is placed at position 40 (i.e.: x=2L/3) of a device in which L=60 nodes. The magnetic excitation is confined for this calculation within the $V_1$-$V_2$ probe leads and the graph gives the signal response to a field of 50 mT emanating from the magnetic bit as a function of the position along the semiconductor edge. The bit dimension in the calculation is 5L/60×L/15. The response of the sensor is plotted both in linear-linear (chart 600, FIG. 6A) and log-linear schedule (chart 602, FIG. 6B) and it illustrates the high spatial resolution provided by such sensors as that described above with respect to FIG. 2.

In addition to the superior sensor attributes already described, no mag-noise and high spatial resolution, the planar geometry and flexibility of fabrication of the integrated device here disclosed permits unique applications for magnetic data storage, magnetometry and imaging technologies. An illustrative magnetometer or imaging system includes a chuck for holding a workpiece and an actuator that is capable of moving the sensor in a rasterized pattern over the workpiece to read the magnetic topography of the workpiece. A sensor according to the present invention may also be useful in other devices requiring a high sensitivity, high resolution sensor.

Some examples of the integrated EMR device are now described.

Magnetic Domain Location Sensor

Whereas in this disclosure, the operation and advantages of the invention have been described mostly citing patterned media as the recording medium, it is to be understood that the present invention is also applicable to other recording media classes and it solves some the roadblocks in employing such material classes for ultrahigh density recording. Self-assembled magnetic materials, highly segregated granular media (with narrow grain size distributions) and media grown on porous templates have been suggested in the literature as potential solutions for ultrahigh density recording. One common pitfall shared by these approaches which hinders their implementation is the variability of the island (grain) position along the track direction. The device here disclosed through one or more of the preferred embodiments here described, can be used in combination with recording materials having such island positioning error to help identify or locate the physical location of the island to be recorded or read. Together with electronics, channels and codes to handle asynchronous data writing and reading, the invention here disclosed permits recording at very high densities without the need to employ costly lithography with stringent island positioning requirements.

Multi-Channel Magnetic Recording

The planar fabrication geometry of the EMR sensors of this invention, the ability to dispense with the need for shields and the absence of magnetostatic interactions betweens the sensors (no ferromagnetic materials are employed) opens up the possibility of multi-channel magnetic recording in hard drive disk environments. An array of judiciously fabricated narrow track sensors as taught herein can be employed to simultaneously address a plurality of data tracks, thereby increasing the read data rate. Adding additional write elements will in addition increase also the write data rate.

Figure 7:
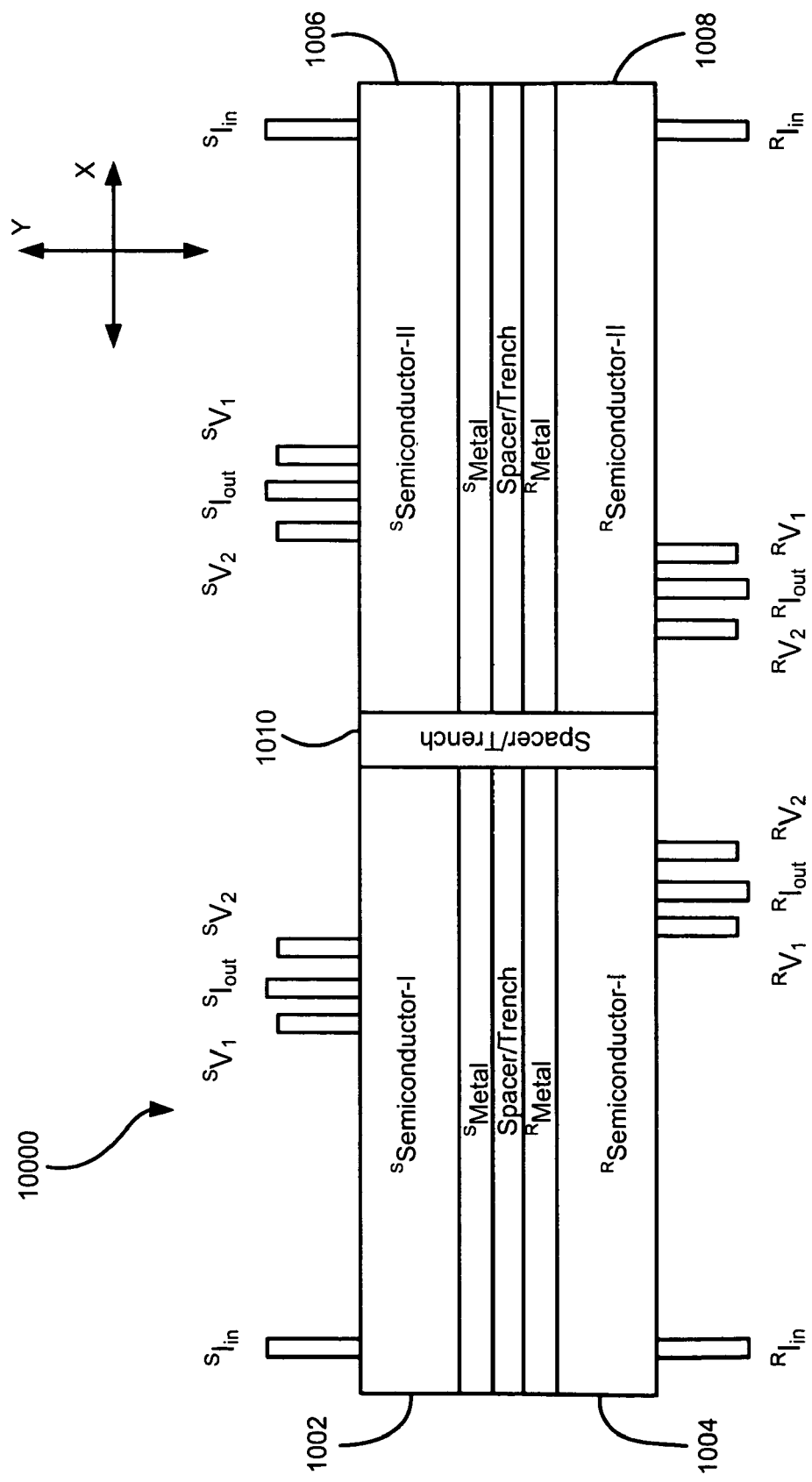
FIG. 7 is a side view of an integrated EMR device array for multi-channel magnetic recording.

FIG. 7 illustrates an embodiment 1000 for multi-channel magnetic recording whereby four co-planarly fabricated EMR sensors 1002, 1004, 1006, 1008 which are electrically isolated by a suitable spacer (trench) 1010 are employed to simultaneously read data from adjacent tracks (e.g., using the R sensors 1004, 1008 at the bottom of the figure). In this embodiment the EMR sensors at the top of the figure (the S sensors 1002, 1006 at the top of the figure) are employed for servoing from the tracks immediately to the left and right of the tracks being read.

It will be obvious to those skilled in the art that the sensor configuration illustrated in FIG. 7, can be readily extended in both x and y coordinates of the plane of the structure as shown to comprise a plurality of EMR sensors to further increase the number of detectors in the array. Such novel arrays can be used to expand the number of data tracks that can be simultaneously read, thereby further increasing the read-data rate. For example, if the servo sensors in the array shown in FIG. 7 are employed to read data, said array would permit simultaneous readout from four adjacent data tracks. Servo control with such an array could be achieved by servoing off the read data and comparing the signal amplitudes from the four independent read sensors to control the actuator for accurate head positioning.

Extending the array shown in FIG. 7 in the x direction (horizontal plane) allows, for example, doubling the number of sensors illustrated in FIG. 7 from four to six, eight, etc. In such configuration, in addition to allowing more than doubling the potential for read data rate, the freedom also exists to use some of the sensors to obtain servo information while simultaneously using others to read data. As an example consider an array where every other adjacent sensor in the same plane of the semiconductor are alternately read and servo sensors, thereby widening the applications of said EMR device arrays in magnetic storage.

Disk Drive System

Figure 8:
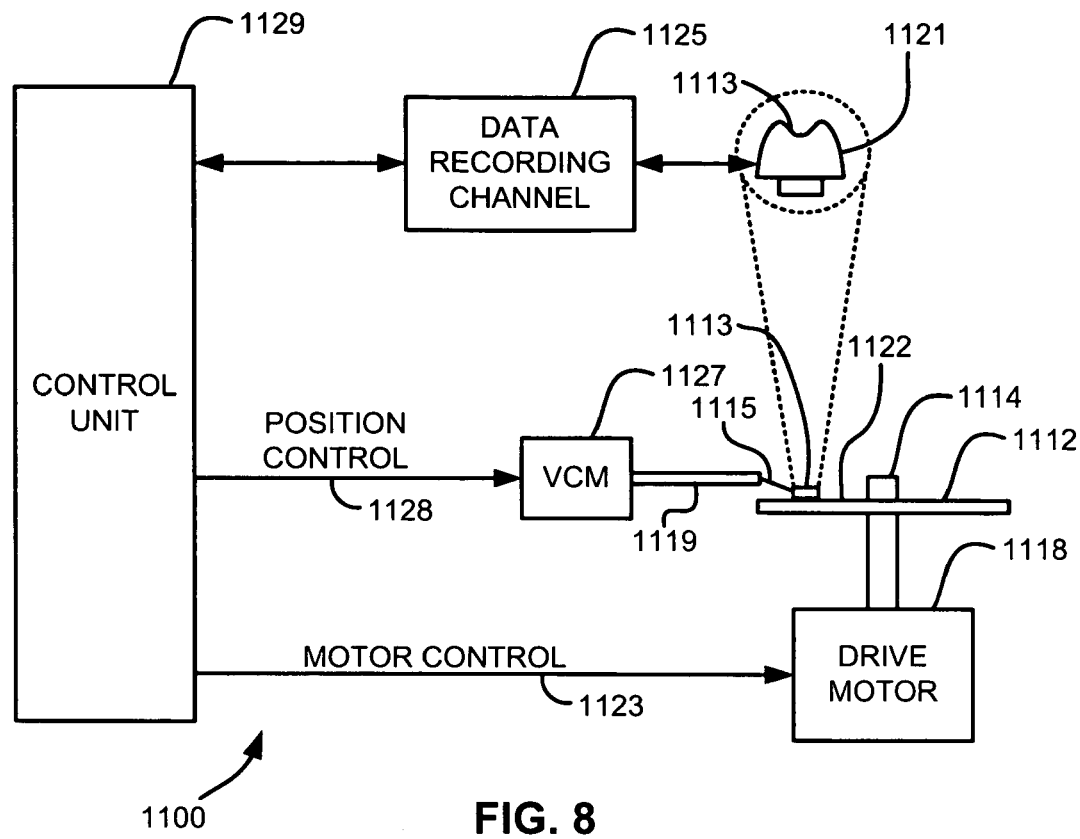
FIG. 8 is a simplified system diagram of a disk drive system in which the invention might be embodied.

Referring now to FIG. 8, there is shown a disk drive 1100 embodying the present invention. As shown in FIG. 8, at least one rotatable magnetic disk 1112 is supported on a spindle 1114 and rotated by a disk drive motor 1118. The magnetic recording on each disk is in the form of an annular pattern of concentric data tracks (not shown) on the disk 1112.

Figure 11:
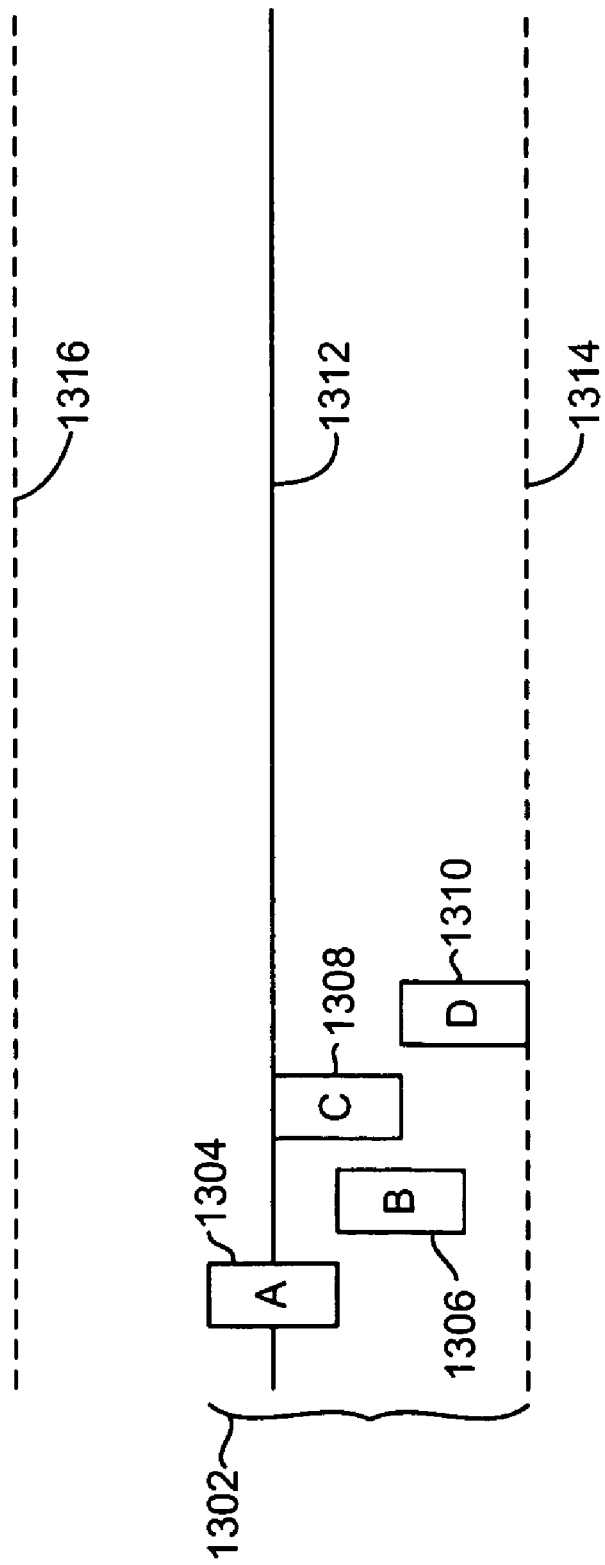

At least one slider 1113 is positioned near the disk 1112, each slider 1113 supporting one or more magnetic read/write heads 1121. Each read/write head includes a integrated servo and read sensor such as an EMR device, which will be described in greater detail below. As the disks rotate, slider 1113 is moved radially in and out over disk surface 1122 so that heads 1121 may access different tracks of the disk where desired data are recorded. Each slider 1113 is attached to an actuator arm 1119 by means of a suspension 1115. The suspension 1115 provides a slight spring force which biases slider 1113 against the disk surface 1122. Each actuator arm 1119 is attached to an actuator means 1127. The actuator means 1127 as shown in FIG. 11 may be a voice coil motor (VCM). The VCM comprises a coil movable within a fixed magnetic field, the direction and speed of the coil movements being controlled by the motor current signals supplied by controller 1129.

During operation of the disk storage system, the rotation of disk 1112 generates an air bearing between slider 1113 and disk surface 1122 which exerts an upward force or lift on the slider. The air bearing thus counter-balances the slight spring force of suspension 1115 and supports slider 1113 off and slightly above the disk surface by a small, substantially constant spacing during normal operation.

The various components of the disk storage system are controlled in operation by control signals generated by control unit 1129, such as access control signals and internal clock signals. Typically, control unit 1129 comprises logic control circuits, storage means and a microprocessor. The control unit 1129 generates control signals to control various system operations such as drive motor control signals on line 1123 and head position and seek control signals on line 1128. The control signals on line 1128 provide the desired current profiles to optimally move and position slider 1113 to the desired data track on disk 1112. Read and write signals are communicated to and from read/write heads 1121 by way of recording channel 1125.

The above description of a typical magnetic disk storage system, and the accompanying illustration of FIG. 8 are for representation purposes only. It should be apparent that disk storage systems may contain a large number of disks and actuators, and each actuator may support a number of sliders.

Scanning Magentometer and Imaging System

Figure 9:
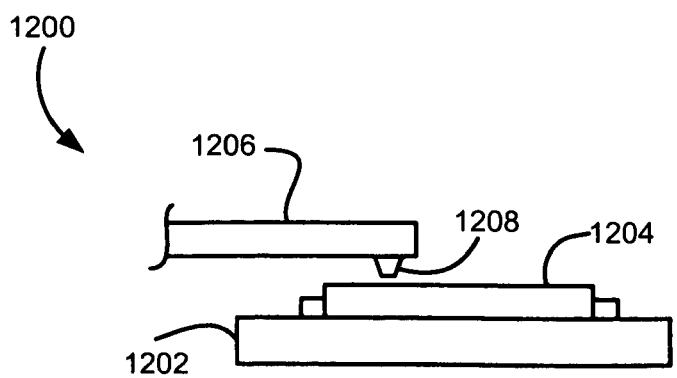
FIG. 9 depicts an illustrative magnetometer or imaging device.

FIG. 9 depicts an illustrative magnetometer 1200 that includes a chuck 1202 for holding a workpiece 1204 and an actuator 1206 that is capable of moving a sensor 1208 as described above in a rasterized pattern over the workpiece 1204 to read the magnetic topography of the workpiece 1204. An illustrative imaging system would have a similar or identical configuration.

Positioning of a Magnetic Head in a Magnetic Data Recording Device Using a Multiple Sensor Array:

With reference now to FIGS. 10-17, a method and apparatus for providing Position Error Signal (PES) using a multiple sensor array is described. The use of a multiple sensor array according to an embodiment of the present invention provides accurate, continuous head servo with minimal disk real estate consumption. The PES is provided by the multiple sensor array by reading a data track, eliminating the need for separate servo sectors for PES signals.

Data recording systems have typically included servo systems that either employ sector servo or dedicated servo systems to provide position error signals to the track-following servo system. Each of these servo schemes has disadvantages that make both approaches less than ideal. Sector servo systems make use of periodic servo bursts on every track that are factory formatted. The space needed for these servo bursts results in overhead that reduces the total amount of available data storage on the drive. In addition, the bandwith of the servo system is limited by the frequency of these servo bursts along each track. Increasing the frequency results in larger overhead, while decreasing the frequency reduces servo bandwidth and the ability of the servo system to reject tracking disturbances. Dedicated servo systems employ one disk surface and one head solely for providing position error signals. While this approach offers nearly unlimited servo bandwidth due to the continuously available position error signal, it has a high cost in terms of overhead (one entire surface of the disk being consumed). Moreover, at today's very narrow track widths, thermal expansion and various dynamic disturbances in the disk stack make the use of dedicated servo impossible, since tracking information provided by one surface on one disk is not precise enough to be used for tracking on another disk or head.

The ideal system for providing position error signals to the servo system would have higher bandwidth than is available from a sector servo system. Little or no overhead consumption that would result in disk data capacity reduction, no errors in the position signal due to deriving the position signal from a location other than the data track currently being read or written by the drive, and the ability to provide the PES on a continuous basis during both reading and writing. The present invention achieves these goals through a novel sensor device with minor increase in the complexity of the PES decoding circuitry in the drive.

The advantage of accommodating greatly increasing servo bandwidth while actually reducing servo overhead provides particular advantage for future drives using patterned media or any other technology that drives the bit aspect ratio to a low value near 1, since these drives will have drastically narrower tracks than today. Such systems, therefore, would benefit greatly from such an improved servo system providing improved servo bandwidth.

Servo bandwidth, of course, depends on more than simply having a high bandwidth position error signal. In particular, the drive also needs to have a high bandwidth actuator, such as a dual actuator system with a milli-actuator or a micro-actuator. Successfully implementing a high bandwidth servo system, however, always requires a high bandwidth PES. The only alternative is to optimize a sector-servo approach to provide enough bandwidth while keeping overhead from becoming excessive. An initial look at this problem shows this to be most challenging for small form-factor, low RPM drives.

The present invention reduces servo overhead by generating a Position Error Signal (PES) from conventional data tracks on a continuous basis. This eliminates the need for the PES portion of a conventional servo sector, leaving only the track-ID portion (which may have a low sampling rate and therefore quite low overhead). Conventional PES generation makes use of spatially complex servo patterns recorded on the disk which are read by the data head. Conventional servo patterns have the property that the signal from the read head changes in a predictable manner depending on where the head reads the pattern relative to the track center. This invention replaces the spatially complex recorded servo pattern with a multiple sensor read head assembly, which allows the capability of determining the lateral position of the head relative to the track center by comparing the signals generated by multiple sensors in different locations on the head.

Figure 10:
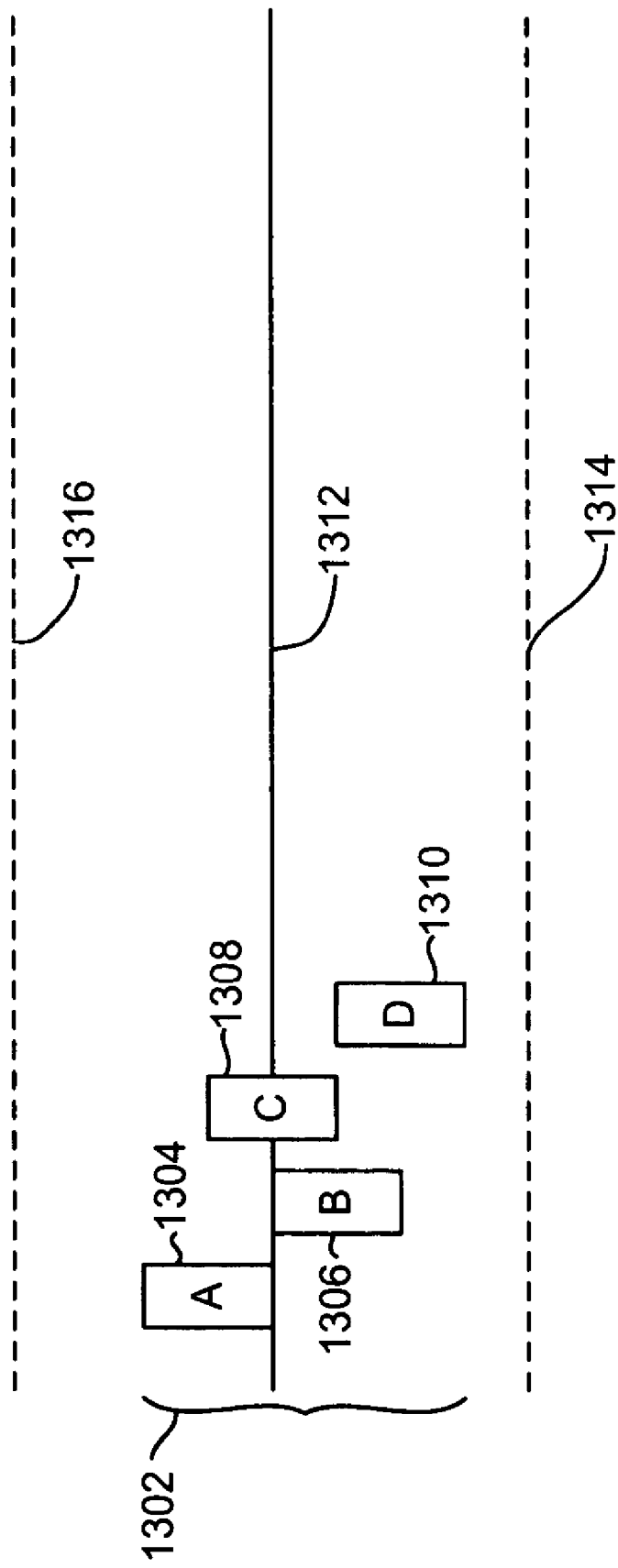
FIGS. 10-13 illustrate an array of sensors for determining a position error signal from a data track, the sensor array being shown in various amounts of track offset.

FIGS. 10-13 show how an array of sensors can be used to determine the position of a slider with respect to a given data track. With particular reference to FIG. 10, a sensor array 1302 includes a plurality of sensors: sensor A 1304; sensor B 1306, sensor C 1308 and sensor D 1310 arranged at varying locations relative to a data track centerline 1312. FIG. 10 also shows possible relative positions of centerlines of adjacent data tracks 1314, 1316. One of the sensors, for example sensor C 1306 is arranged so as to be positioned over the desired data track 1312 to read data from that track when the array 1302 is correctly located over the track 1312. As those skilled in the art will appreciate, the arrangement of sensors 1304, 1306, 1308, 1310 is similar to that of a quad burst data pattern, except that in this case the sensors are arranged in desired pattern, rather than data bursts recorded on the disk. More specifically, the sensor A 1304 is off track by +¾ track width, B 1306 is off track by +¼ track width. C 1308 is on track and D is off track by −½ track width. These arrangements of the sensors are with respect to track sensor C 1308, which is considered to be the "on track" sensor.

Figure 12:
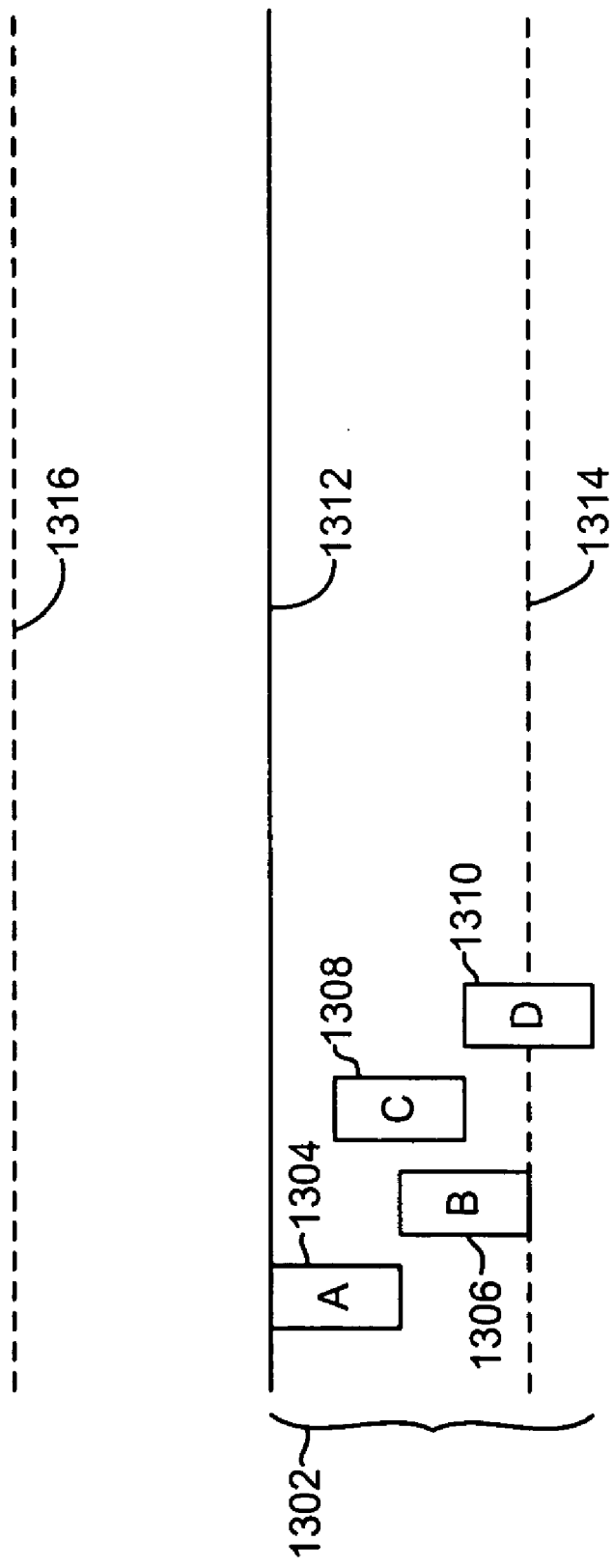
Figure 13:
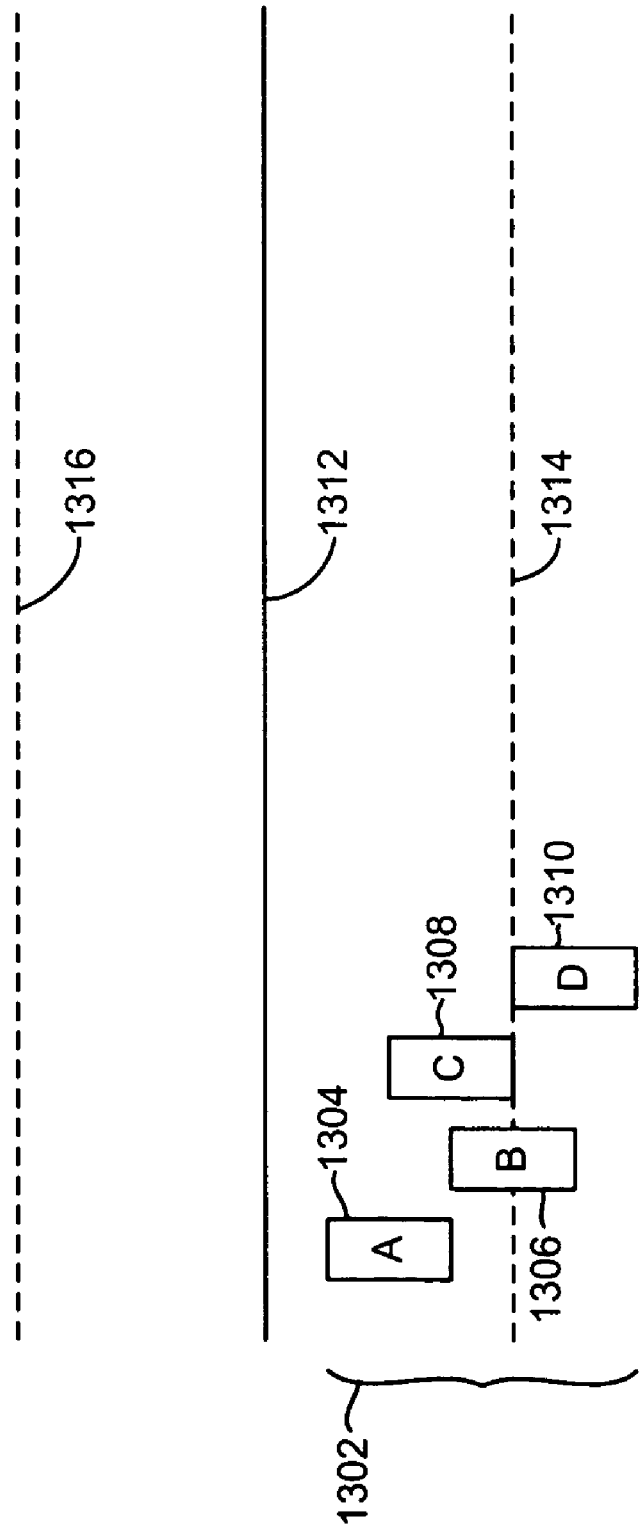

With reference to FIGS. 11-13, the position of the various sensors 1304, 1306, 1308, 1310 relative to the data tracks 1312-1316 for various amounts of off track registration are shown. For example, in FIG. 14, the sensor array 1302 is off track by an amount of ¼ track width. In FIG. 12, the array 1302 is off track by ½ track width, and in FIG. 13, the sensor array 1302 is off track by ¾ track width.

The array of sensors 1304-1310 form sensor pairs, such as A-B and C-D. Signals from these sensor pairs are analyzed using a correlation function, which will be described in greater detail below. Since the array of heads shown in FIGS. 10-13 has the read elements offset from one another not only in the cross-track direction, but also in the down-track direction, it is necessary that an appropriate delay be applied to certain signals, such as signals C and D (assuming the head travels to the right over the medium as shown in FIGS. 10-13) in order for the correlation to work properly. Applying an appropriate delay to signals from sensors C and D 1308, 1310 relative to those from sensors A and B 1304, 1306 allows the invention to be implemented with any desired down-track spacing of the elements. For best results it is preferable that the data from adjacent tracks not be correlated. In order to ensure that neighboring tracks are not correlated (even if the user data stored on neighboring tracks might be correlated) a data randomizer can be implemented.

Figure 14:
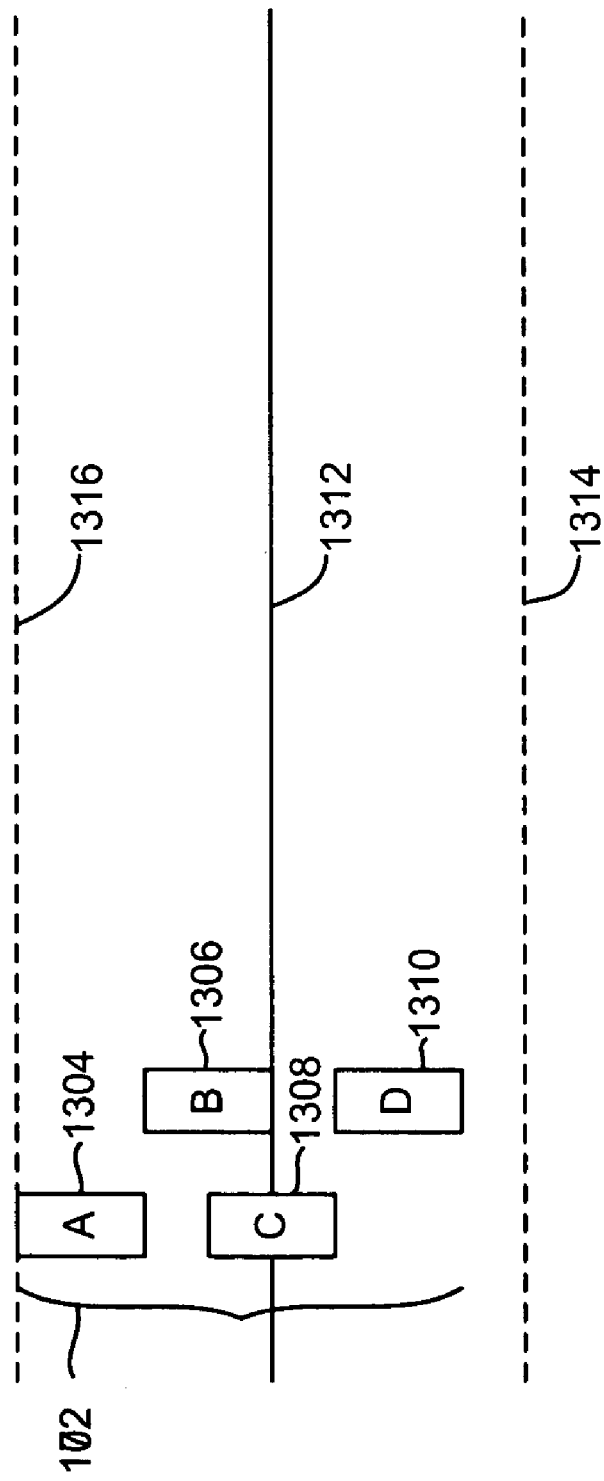
FIG. 14 illustrates an array of sensors having an arrangement of sensors according to an embodiment of the invention, the arrangement of sensors being different from the array illustrated in FIGS. 13-16.

Although the array 1302 is shown in FIGS. 10-13 as having a particular arrangement of sensors 1304-1310, this is by way of example only, as other arrangements of sensors and numbers of sensors are possible as well. For example, FIG. 14 shows an array 1702 of sensors 1302-1310 that can be employed to determine a PES. The array 1702 shown in FIG. 14 is functionally equivalent to the array 1302 shown in FIG. 10. However, the arrangement shown in FIG. 14 facilitates fabrication of the sensor array 1702 on a slider such as in an EMR sensor array as will be described in greater detail herein below.

Note that in either of the arrays 1302 (FIGS. 10-13) or 1702 (FIG. 14) the element C (1308) serves double duty for both PES generation and data read-back. When the array is properly positioned over the track, element C is centered on the data track and can be used to read data just like the single read sensor in a conventional disk drive.

Figure 15:
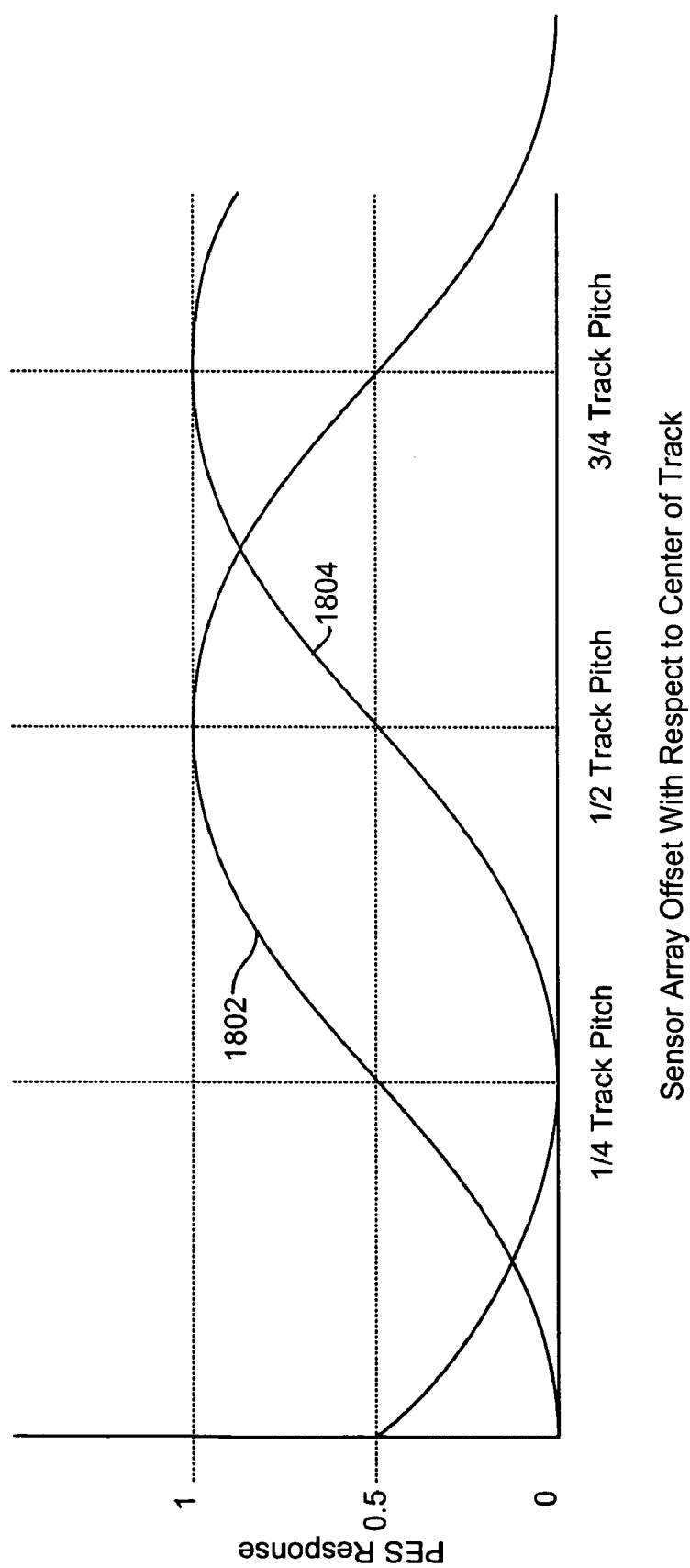
FIG. 15 is a graph illustrating the position error signal response based on sensor correlation functions for a variety of sensor array offsets.

The Position Error Signal (PES) for the array 1302, or 1702 is determined by generating correlation functions for AB and CD (where  represents the correlation function and A, B, C and D represent the sensors 1304, 1306, 1308, 1310 respectively). FIG. 15 graphically shows the correlation functions AB (1802) and CD (1804) for a sensor array such as the sensor arrays 1302, 1702. The correlation functions have unique values for each amount of offset, and, although distinct increments of offset are shown in FIGS. 10-13, the correlation functions AB and C**D vary in a smooth monotonic fashion, allowing for unambiguous computation of the head lateral offset position (the PES) at any position. These signals are similar to the primary and secondary PES signals derived using quad-burst patterns in prior art disk drive systems and are, therefore, easily utilized in a disk drive servo system. As mentioned above, an appropriate delay is added to the signals from the up-track sensor of each sensor pair so that the correlation inputs are signals derived from the same down-track position.

Figure 16:
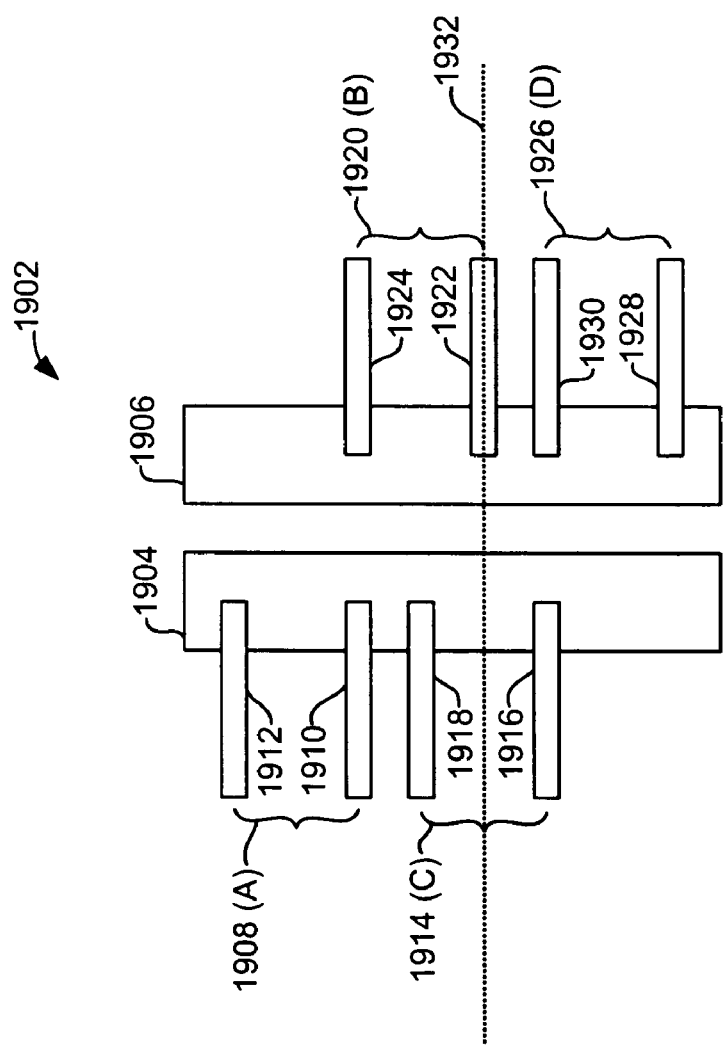
FIG. 16 is a schematic representation of an EMR sensor providing a sensor array according to an embodiment of the invention.

Although an array of sensors according to an embodiment of the present invention can be constructed using any number of sensors, such as giant magnetoresistive sensors (GMR) tunnel valves (TMR) or other sensors, such an array can be most readily constructed using an extraordinary magnetoresistive device (EMR) such as that described with reference to FIG. 7. A schematic representation of an array structure 1902 that can be constructed as an EMR sensor is shown in FIG. 16. The sensor array structure 1902 includes back to back first and second EMR structures 1904, 1906 each of which may contain a semiconductor structure and a metal conductor (as described in FIG. 7). The first EMR structure 1904 includes a first sensor portion (sensor A) 1908 defined by first and second voltage leads 1910, 1912, and a second sensor portion (sensor C) 1914 defined by third and fourth voltage leads 1916, 1918. Similarly, the second EMR structure 1906 includes a third sensor portion (sensor B) 1920 defined by fifth and sixth voltage leads 1922, 1924, and a fourth sensor portion 1926 (sensor D) defined by seventh and eighth voltage leads 1928, 1930. The sensor array 1902 is functionally equivalent to that of arrays 1702 and 1302.

The sensor portions 1908 (sensor A), 1914 (sensor C), 1924 (sensor B) and 1926 (sensor D) can be arranged such that sensor C 1914 can be configured to read a desired data track 1932 and to be centrally located over the desired data track when the array 1902 is correctly located over the data track. The represents the centerline of the data track 1932. The planar fabrication geometry implied in FIG. 16 permits adjustment of the position of the adjacent sensor pairs (A, B and C, D) as well as the spacing between the pairs. The sensor array servo system described can be particularly advantageous for use in a patterned media system wherein magnetic islands can be formed on the media prior to recording and reading. In that case the position of the sensor pairs (A, B and C, D) 1908, 1914, 1920, 1926 can be arranged to accommodate the spacing between the magnetic islands of the patterned media. The invention can also be used with a conventional media, in which case the sensor pairs (A, B and C, D) 1908, 1914, 1920, 1926 can be spaced to accommodate the track pitch and track spacing.

As can be seen, each sensor portion has a unique offset with respect to the desired track 1932. For example, in the embodiment shown in FIG. 16, when the array is correctly located over the desired track 1932 (ie. zero offset), the sensor C 1914 is directly over the desired track 1932. The sensor A 1908 may be off track by, for example +¾ track, whereas sensor D could be off track by, for example, –½ track. Sensor B on the other had could be off track by, for example, +¼ track. As the array 1902 moves off of the desired track, the amount of signal (eg. signal amplitude) detected by each of the sensors A, B, C and D (1908, 1914, 1920, 1926) will change accordingly. For example, with the arrangement just described, if the array 1902 is off track by +¼ track, the sensor A will detect a full signal while the sensor C sill detect less than a full signal. On the other hand, if the array is off center by –¼ track, the sensor B 1920 will detect a full signal, sensor A 1908 will detect no signal, sensor C 1914 will detect a less than full signal, and sensor D 1926 will detect less than a full signal. The response from these signals can, therefore, be calculated using the correlation functions as described with reference to FIG. 15.

Figure 17:
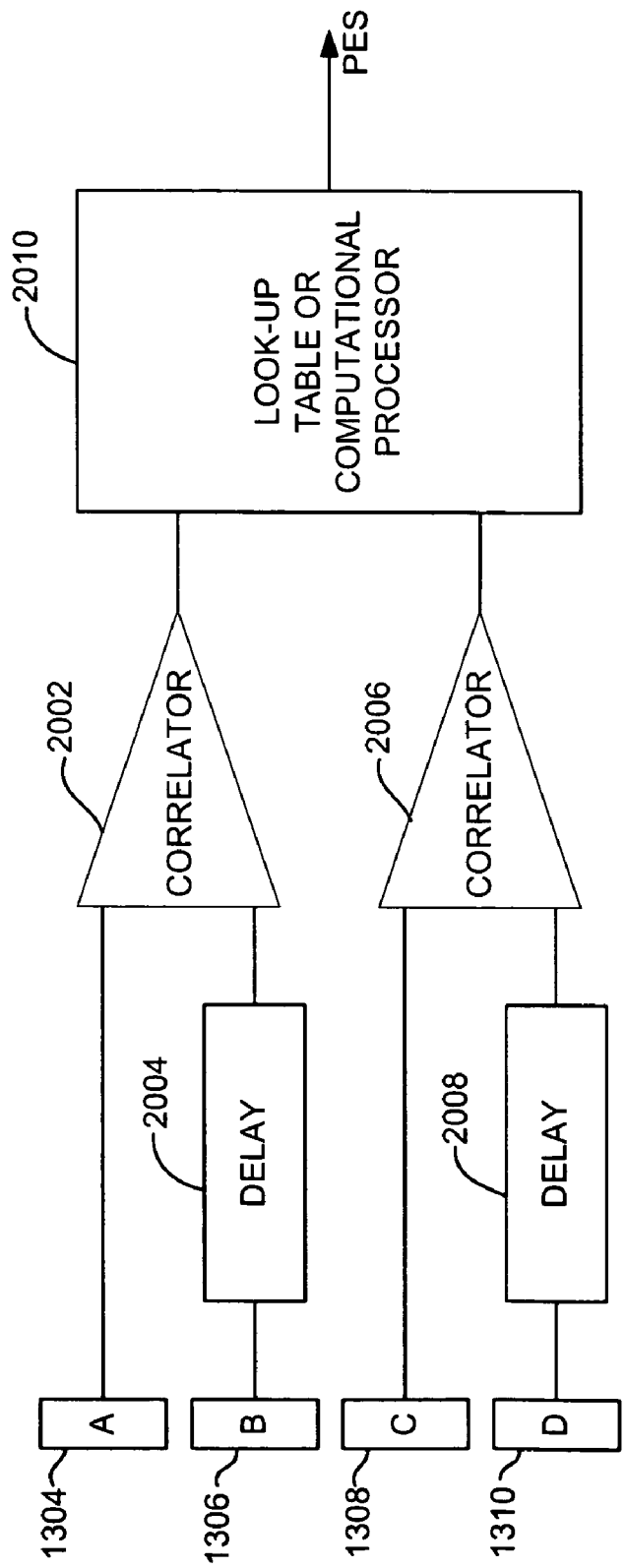
FIG. 17 is a schematic illustration circuitry for determining a position error signal (PES) derived from a data signal using a sensor array.

FIG. 17 shows a schematic illustration of a position error signal (PES) generator using the sensor array shown above. Using the correlation values of AB and CD, the PES value can be generated either by using a look-up table with a 2×2 matrix of values, or can be calculated using appropriate functions based on the geometry of the sensor array and the known properties of the data tracks on the disk.

With reference to FIG. 17, a signal from the sensor A 1304 passes to a first correlator 2002. A signal from sensor B 1306 passes through a delay circuit 2004 and then to the first correlator 2002. Similarly, a signal from the sensor C 1308 passes to a second correlator 2006, and a signal from the sensor D 1310 passes through a delay circuit 2008 and then to the second correlator 2006. Correlation signals from the correlators 2002, 2006 processed using a look-up table or computational processor 2010, which produces a position error signal (PES) 2012.

The time delay provided by the delay circuits can be used to compensate for the fact some of the sensors are located at different points along the data track and therefore read the same signal at a slightly different time. For example, in the device described with reference to FIG. 16, the signal read by B will be slightly ahead of that read by signal A. Similarly the signal read by sensor D is slightly ahead of that read by sensor C.

An advantageous aspect of a recording system according to the invention is that it generates the PES on a continuous basis, and can do so while the write head is actively writing. Since the write element normally shares the same substrate (slider) as the read sensor or sensors, it would be possible to have severe crosstalk interference between the write and read head signals. Use of time delay circuitry 2002, 2006 on the signals from the elements B and D provides the added advantage of reducing the sensitivity of the PES to crosstalk interference from the write head. If the write head signal is added in any proportion to any or all of the signals from elements A-D, there will be minimal effect on the PES. If there were no delays present, coupling of the write signal into A and B and/or C and D would create undesired correlation between these signals. However, with the time delays, and appropriate constraints on the coding of the write signal, the delayed version of the write signal shows no long-term correlation with the non-delayed version of the same signal so there is no effect at the output of the correlators 2002, 2006.

It should be pointed out that the correlators 2002, 2006 perform the correlation over an effective time scale which is many bits long. On a bit-by-bit basis there is a 50% probability of correlation at any given moment. However, over a sequence of, for example, 100 bits, there will be virtually zero correlation between signals from adjacent tracks or between read and write signals. The write head is generally many tracks away and, therefore, is uncorrelated due to the data randomizer constraint. Performing the correlation over a long sequence of bits limits the bandwidth of the servo system by introducing a delay into the generation of the PES. However, providing PES with something like 100 bits correlation length is still far better, from a servo bandwidth point of view, than using a sector servo scheme that outputs a single PES value with each sector (normally many thousands of bits long).

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for determining an Position Error Signal (PES) in a magnetic data recording system, the method comprising:
   recording a data track;
   providing a sensor array comprising a plurality of sensors each of the plurality of sensors having a unique location relative to other sensors in the array;
   reading the data track using the sensors in the array; and
   determining a position error signal based on a signal response from the sensors in the sensor array.

2. A method as in claim 1 wherein the sensors in the array are extraordinary magnetoresistive (EMR) sensors.

3. A method as in claim 1 wherein the sensors in the array are giant magnetoresistive (GMR) sensors.

4. A method as in claim 1 wherein the sensors in the array are tunnel valve (TMR) sensors.

5. A method as in claim 1 wherein the sensors are Extraordinary Magnetoresisitive (EMR) sensors and wherein the array comprises:
   first and second semiconductor portions separated from one another by an electrically insulating gap;
   first and second electrically conductive voltage leads electrically connected with a side of the first semiconductor portion opposite the electrically insulating gap, the first and second voltage leads defining a first sensor portion;
   third and fourth electrically conductive voltage leads electrically connected with the side of the first semiconductor portion opposite the electrically insulating gap, the third and fourth voltage leads defining a second sensor portion;
   fifth and sixth electrically conductive voltage leads electrically connected with a side of the second semiconductor portion opposite the electrically insulating gap, the fifth and sixth voltage leads defining a third sensor portion; and
   seventh and eighth electrically conductive voltage leads electrically connected with the side of the second semiconductor portion opposite the electrically insulating gap, the seventh and eighth voltage leads defining a fourth sensor portion.

6. A method as in claim 1 wherein the sensors in the array are Hall effect-based sensors.

7. A method as in claim 1 wherein each of the sensors have a unique position in the array in a direction perpendicular to the data track.

8. A method as in claim 1 wherein the array of sensors comprises four sensors.

9. A method for determining a Position Error Signal (PES) in a magnetic data recording system, the method comprising:
   recording a data track;
   providing a sensor array comprising a plurality of sensors each of the plurality of sensors having a unique location relative to other sensors in the;
   reading the data track using the sensor array: and
   calculating a correlation function for at least one pair of sensors in the sensor array; and
   determining a position error signal based on the correlation function.

10. A method as in claim 9 further comprising providing a delay to a response from at least one of the sensors.

11. A method as in claim 9 wherein each of the sensors have a unique position in the array in a direction perpendicular to the data track.

12. A data recording system, comprising:
   a magnetic medium capable of having a data track recorded thereon;
   a sensor array having a plurality of sensors arranged to have a variety of offsets relative to one another, the sensors being functional to read the data track and provide a response; and
   circuitry for analyzing a response from each of the sensors to determine a position error signal.

13. A system as in claim 12 wherein the circuitry generates a correlation between the responses of at least two of the sensors.

14. A system as in claim 13 wherein the circuitry further includes circuitry for providing a delay to the response of at least one of the sensors.

15. A system as in claim 12 wherein the sensors are extraordinary magnetoresistive (EMR) sensors.

16. A system as in claim 12 wherein the sensors are giant magnetoresistive (GMR) sensors.

17. A system as in claim 12 wherein the sensors are tunnel valve (TMR) sensors.

18. A system as in claim 12 wherein the sensors are Extraordinary Magnetoresisitive (EMR) sensors and wherein the array comprises:
   first and second semiconductor portions separated from one another by an electrically insulating gap;
   first and second electrically conductive voltage leads electrically connected with a side of the first semiconductor portion opposite the electrically insulating gap, the first and second voltage leads defining a first sensor portion;
   third and fourth electrically conductive voltage leads electrically connected with the side of the first semiconductor portion opposite the electrically insulating gap, the third and fourth voltage leads defining a second sensor portion;
   fifth and sixth electrically conductive voltage leads electrically connected with a side of the second semiconductor portion opposite the electrically insulating gap, the fifth and sixth voltage leads defining a third sensor portion; and
   seventh and eighth electrically conductive voltage leads electrically connected with the side of the second semiconductor portion opposite the electrically insulating gap, the seventh and eighth voltage leads defining a fourth sensor portion.

19. A system as in claim 12 wherein the sensors are Hall effect-based sensors.

20. A system as in claim 12 wherein the sensor array having a plurality of sensors is arranged to have a variety of offsets relative to one another in a direction perpendicular to the data track.

21. A system as in claim 12 wherein the array of sensors comprises four

22. An apparatus for generating a position error signal (PES) for servo tracking in a magnetic data recording system, said apparatus comprising:
   a read head assembly that includes a plurality of sensors placed at different locations in the read head assembly, the sensors being capable of reading a data track on a magnetic medium; and logic functional to employ an algorithm for computing a lateral offset of the read head assembly by generating a correlation between signal outputs of at least two of the sensors.

23. An apparatus as in claim 22 wherein the sensors of the read head assembly are extraordinary magnetoresistive (EMR) sensors.

24. An apparatus as in claim 22 wherein the sensors of the read head assembly are giant magnetoresistive (GMR) sensors.

25. An apparatus as in claim 22 wherein the sensors of the read head assembly are Hall effect-based sensors.

26. An apparatus as in claim 22 further comprising a processor that computes the lateral offset of the read head assembly based on signals from the plurality of sensors using a combination of correlators and time delay functions.

27. An apparatus as in claim 26 wherein the read head assembly includes four sensors each having a distinct lateral position perpendicular to the data track.

28. An apparatus as in claim 26 wherein the processor computes the read head assembly lateral offset with respect to the data track by comparing the level of correlation between signals from one pair of sensors to the correlation between signals from another pair of sensors.

29. A magnetic disk drive, comprising:
a magnetic disk;
a magnetic head including a write element and a sensor array including a plurality of sensors the write element being capable of writing a data track onto the disk; and
a signal processor that computes a lateral position of the magnetic head relative to a recorded data track on the disk by comparing the level of correlatation between signals derived from multiple pairs of sensor elements.

30. A disk drive as in claim 29 wherein the computation of lateral position of the head array occurs on a continuous basis.

31. A disk drive system as in claim 29 wherein the computation of lateral position of the head array occurs during reading and writing of data on the magnetic disk.

32. A disk drive system as in claim 29 wherein the disk is a patterned media.

* * * * *

UNITED STATES PATENT AND TRADEMARK OFFICE
CERTIFICATE OF CORRECTION

PATENT NO. : 7,502,193 B2  Page 1 of 1
APPLICATION NO. : 11/508538
DATED : March 10, 2009
INVENTOR(S) : Thomas Robert Albrecht et al.

It is certified that error appears in the above-identified patent and that said Letters Patent is hereby corrected as shown below:

In claim 9, column 17, line 63 replace "array: and" with --array; and--.

Signed and Sealed this

Eighth Day of June, 2010

David J. Kappos
*Director of the United States Patent and Trademark Office*